(12) United States Patent
Kotaka

(10) Patent No.: US 9,794,581 B2
(45) Date of Patent: Oct. 17, 2017

(54) IMAGE PROCESSING DEVICE AND IMAGE PROCESSING METHOD, PROGRAM, AND IMAGING APPARATUS

(71) Applicant: Sony Corporation, Minato-ku (JP)

(72) Inventor: Naohiko Kotaka, Tokyo (JP)

(73) Assignee: SONY CORPORATION, Tokyo (JP)

( * ) Notice: Subject to any disclaimer, the term of this patent is extended or adjusted under 35 U.S.C. 154(b) by 268 days.

(21) Appl. No.: 14/278,037

(22) Filed: May 15, 2014

(65) Prior Publication Data

US 2014/0376642 A1    Dec. 25, 2014

(30) Foreign Application Priority Data

Jun. 24, 2013   (JP) ................. 2013-131320

(51) Int. Cl.
*H04N 19/436* (2014.01)

(52) U.S. Cl.
CPC .................... *H04N 19/436* (2014.11)

(58) Field of Classification Search
CPC ................................................ H04N 19/436
USPC ..................................................... 375/240.26
See application file for complete search history.

(56) References Cited

U.S. PATENT DOCUMENTS

| 5,646,687 A | 7/1997 | Botsford, III et al. |
| 6,553,068 B1 | 4/2003 | Wake et al. |
| 8,170,120 B2 | 5/2012 | Fuchie et al. |
| 2006/0093031 A1* | 5/2006 | Van Der Schaar .... H04N 19/61 375/240.01 |
| 2006/0256867 A1* | 11/2006 | Turaga ................... H04N 19/39 375/240.16 |
| 2007/0133678 A1 | 6/2007 | Sakai |
| 2010/0033622 A1* | 2/2010 | Bellers ................... H04N 19/39 348/448 |
| 2013/0202051 A1* | 8/2013 | Zhou .................... H04N 19/436 375/240.26 |
| 2015/0023409 A1* | 1/2015 | Schierl ................... H04N 19/70 375/240.02 |
| 2016/0088308 A1* | 3/2016 | Choudhary .......... H04N 19/436 375/240.12 |

FOREIGN PATENT DOCUMENTS

| JP | 2011-211498 | 10/2011 |
| JP | 2012-253516 | 12/2012 |

OTHER PUBLICATIONS

U.S. Appl. No. 14/267,245, filed May 1, 2014, Kotaka.

* cited by examiner

*Primary Examiner* — William C Vaughn, Jr.
*Assistant Examiner* — Jae N Noh
(74) *Attorney, Agent, or Firm* — Oblon, McClelland, Maier & Neustadt, L.L.P.

(57) ABSTRACT

Provided is an image processing device including: a division unit that divides pictures of image data into multiple arrangements; multiple coding units, each of which codes pictures in the mutually-different arrangements that result from the division by the division unit and generates a stream; and a composition unit that composites the streams in the arrangements, which are generated by the multiple coding units, in which the coding unit generates header information on the stream in such a manner that a stream which results from the compositing by the composition unit becomes normal.

15 Claims, 14 Drawing Sheets

FIG. 7

| | |
|---|---|
| pic_parameter_set | num_ref_idx_l0_active_minus1 |
| pic_timing SEI | cpb_removal_delay |
| slice header | frame_num |
| slice header | pic_order_cnt_lsb |
| slice header | num_ref_idx_l0_active_minus1 |
| slice header | ref_pic_list_reordering_flag_l0 |
| slice header | reordering_of_pic_nums_idc |
| slice header | abs_diff_pic_num_minus1 |

IMAGE PROCESSING DEVICE AND IMAGE PROCESSING METHOD, PROGRAM, AND IMAGING APPARATUS

CROSS REFERENCE TO RELATED APPLICATIONS

This application claims the benefit of Japanese Priority Patent Application JP 2013-131320 filed Jun. 24, 2013, the entire contents of which are incorporated herein by reference.

BACKGROUND

The present disclosure relates to an image processing device, an image processing method, a program and an imaging apparatus, and particularly to an image processing device, an image processing method, a program, and an imaging apparatus, which are capable of easily performing coding of an image.

In the related art, there is a method in which parallel processing is, for example, performed in a picture unit using multiple encoders in coding a moving image (for example, refer to Japanese Unexamined Patent Application Publication No. 2008-66851 (corresponding to U.S. Pat. No. 8,170, 120) and Japanese Unexamined Patent Application Publication No. 2011-211498).

SUMMARY

However, in the method in the related art, there is a concern that complicated control is necessary to perform coding operations in parallel.

It is desirable to easily perform coding of an image.

According to an embodiment of the present disclosure, there is provided an image processing device including: a division unit that divides pictures of image data into multiple arrangements; multiple coding units, each of which codes pictures in the mutually-different arrangements that result from the division by the division unit and generates a stream; and a composition unit that composites the streams in the arrangements, which are generated by the multiple coding units, in which the coding unit generates header information on the stream in such a manner that a stream which results from the compositing by the composition unit becomes normal.

In the image processing device, the coding unit may generate the header information in such a manner that information relating to the picture and a reference picture becomes normal in the stream that results after the composition.

In the image processing device, the coding unit may generate the header information in such a manner that a value of syntax which stipulates a maximum value of a reference index in a reference picture list becomes a normal value in the stream that results after the composition.

In the image processing device, the coding unit may generate the header information in such a manner that a value of syntax relating to a point in time at which reading from a coded picture buffer is performed becomes a normal value in the stream that results after the composition.

In the image processing device, the coding unit may generate the header information in such a manner that a value of syntax which is used as an identifier of a short-term reference picture becomes a normal value in the stream that results after the composition.

In the image processing device, the coding unit may generate the header information in such a manner that a value of syntax which is used in calculating a picture order count (POC) becomes a normal value in the stream that results after the composition.

In the image processing device, the coding unit may generate the header information in such a manner that a value of syntax indicating a maximum reference index value of a reference picture list becomes a normal value in the stream that results after the composition.

In the image processing device, the coding unit may generate the header information in such a manner that a value of flag information relating to rearranging of a reference picture list becomes a normal value in the stream that results after the composition.

In the image processing device, the coding unit may generate the header information in such a manner that a value of syntax relating to control of rearranging of a reference picture list becomes a normal value in the stream that results after the composition.

In the image processing device, the coding unit may generate the header information in such a manner that a value of syntax indicating an absolute value of a difference between a picture number of a picture that is moved to a current index of a reference picture list and a prediction value of the picture number becomes a normal value in the stream that results after the composition.

In the image processing device, each coding unit may code the picture in the arrangement that is assigned to the each coding unit, according to a group-of-pictures (GOP) structure, and the composition unit may composite the streams in the arrangements according to the GOP structure in image data that is present before the division unit performs the division.

In the image processing device, the coding unit may code the picture that is the front of the GOP in the arrangement which is assigned to the coding unit, but is not the front of the GOP in the image data which is present before the division unit performs the division, as a P picture that is entirely configured from all intra macro blocks.

According to another embodiment of the present disclosure, there is provided an image processing method including: dividing pictures of image data into multiple arrangements; coding pictures in each of the arrangements that result from the division, and generating a stream in each of the arrangements; generating header information on the stream in such a manner that a stream which results after composition becomes normal, in coding the pictures in each of the arrangements; and compositing the generated streams in each of the arrangements.

According to still another embodiment of the present disclosure, there is a program for causing a computer to perform: dividing pictures of image data into multiple arrangements; coding pictures in each of the arrangements that result from the division, and generating a stream in each of the arrangements; generating header information on the stream in such a manner that a stream which results after composition becomes normal, in coding the pictures in each of the arrangements, and compositing the generated streams in each of the arrangements.

According to further still another embodiment of the present disclosure, there is provided an image processing apparatus including: an imaging unit that images a photographic subject; a division unit that divides pictures of image data that the imaging unit obtains by imaging the photographic subject into multiple arrangements; multiple coding units, each of which codes pictures in the mutually-different arrangements that result from the division by the division unit and generates a stream; and a composition unit that composites the streams in the arrangements, which are generated by the multiple coding units, in which the coding unit generates header information on the stream in such a manner that a stream which results from the compositing by the composition unit becomes normal.

According to the embodiment of the disclosure, pictures of image data are divided into multiple arrangements; pictures in each of the arrangements that result from the division are coded and a stream in each of the arrangements is generated; header information on the stream is generated in such a manner that a stream which results after composition becomes normal, in coding the pictures in each of the arrangements; and the generated streams in each of the arrangements are composited.

According to the embodiment of the disclosure, a photographic subject is imaged; pictures of image data that is obtained by imaging the photographic subject are divided into multiple arrangements; pictures in each of the arrangements that result from the division are coded and a stream in each of the arrangements is generated; header information on the stream is generated in such a manner that a stream which results after composition becomes normal, in coding the pictures in each of the arrangements; and the generated streams in each of the arrangements are composited.

According to the present disclosure, an image can be processed. Particularly, the reduction in image quality due to the coding of the image can be suppressed.

BRIEF DESCRIPTION OF THE DRAWINGS

FIG. 7 is a diagram illustrating an example of syntax.

DETAILED DESCRIPTION OF EMBODIMENTS

Embodiments according to the present disclosure (hereinafter referred to as embodiments) are described below. Moreover, an order in which descriptions are provided is as follows.

1. First Embodiment (Image Coding Device)
2. Second Embodiment (Image Coding Device)
3. Third Embodiment (Computer)
4. Fourth Embodiment (Imaging Apparatus)

1. First Embodiment

Parallel Image Coding in the Related Art

In the related art, there is a method in which parallel processing is, for example, performed in a picture unit using multiple encoders in coding a moving image (for example, refer to Japanese Unexamined Patent Application Publication No. 2008-66851 and Japanese Unexamined Patent Application Publication No. 2011-211498).

Figure 1:
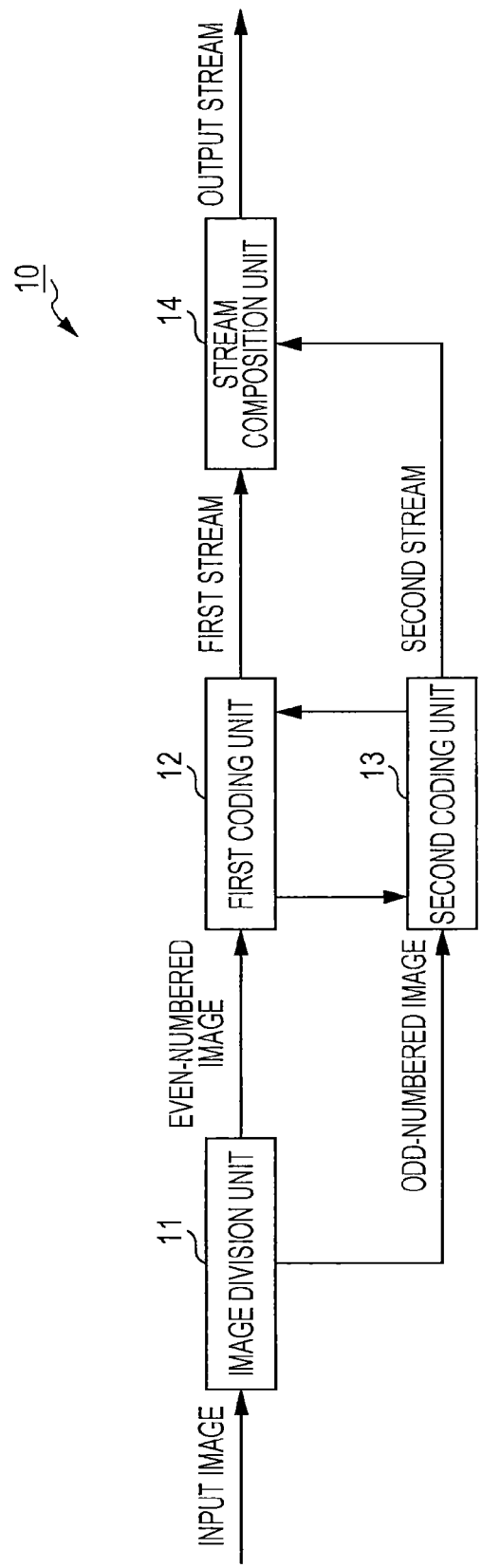
FIG. 1 is a block diagram illustrating a main configuration example of an image coding device.

For example, like in an image coding apparatus 10 illustrated in FIG. 1, an image division unit 11 divides an input image into an even-numbered image and an odd-numbered image, a first coding unit 12 and a second coding unit 13 code the even-numbered image and the odd-numbered image mutually in parallel, respectively, and a stream composition unit 14 composites a first stream generated in the first coding unit 12 and a second stream generated in the second coding unit 13 and thus generates and outputs an output stream.

At that time, with a method disclosed in Japanese Unexamined Patent Application Publication No. 2011-211498, it is necessary to deliver and receive a reference image between the first coding unit 12 and the second coding unit 13 (a transmission processing unit 110 and a reception processing unit 120 in Japanese Unexamined Patent Application Publication No. 2011-211498), and there is a concern that an amount of transmission of the reference image becomes large, and thus coding is difficult to perform easily. Basically, in order to realize such coding, it is necessary to design a communication path (a communication path 140 in Japanese Unexamined Patent Application Publication No. 2011-211498) between the first coding unit 12 and the second coding unit 13 in a manner that broadens a band as the communication path, and there is a concern that a hardware cost increases.

Figure 5:
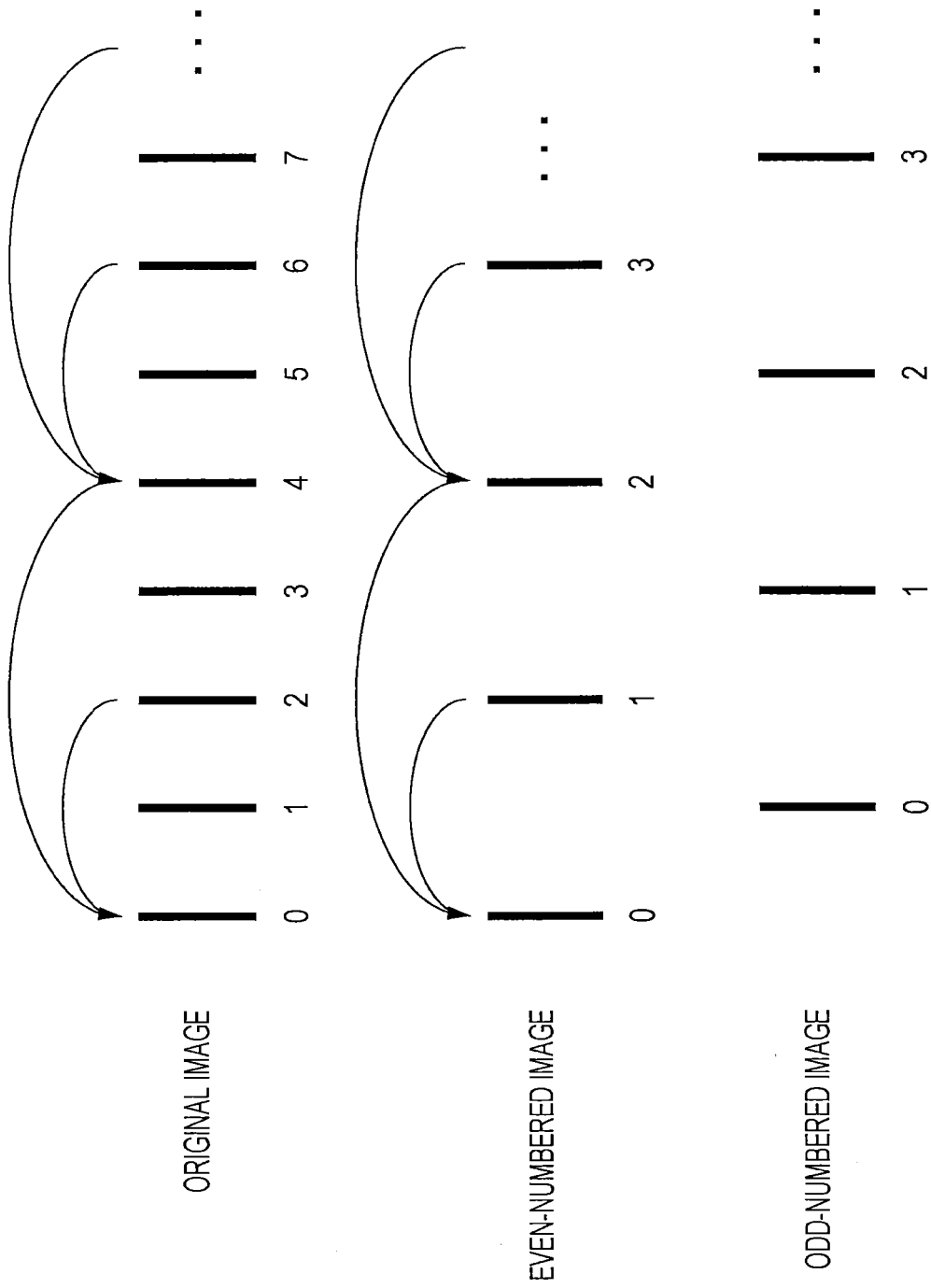
FIG. 5 is a diagram for describing a reference relationship between an original image and an even-numbered image.

Furthermore, with this method, there is a concern that a dependence relationship occurs between coding processing by the first coding unit 12 (a first LSI in Japanese Unexamined Patent Application Publication No. 2011-211498) and coding processing by the second coding unit 13 (a second LSI in Japanese Unexamined Patent Application Publication No. 2011-211498). For example, as illustrated in FIG. 5 in Japanese Unexamined Patent Application Publication No. 2011-211498, there is the concern that the dependence relationship occurs in which after the coding of the even-numbered image by the first coding unit 12 is performed, transfer between chips is performed and the coding of the odd-numbered image by the second coding unit 13 is performed. In order to maintain such a dependency relationship, it is necessary not only to control each of the processing by the first coding unit 12 and the processing by the second coding unit 13 in a simple manner, but also to control both of the processing by the first coding unit 12 and the processing by the second coding unit 13 in an integrated manner. Because of this, it is necessary to perform complicated control, and there is a concern that the coding is difficult to perform easily. Furthermore, accordingly, there is a concern that a development cost increases.

Image Coding Device

Then, the mutual dependence relationship is made to be canceled without delivering and receiving information between the coding processing by the first coding unit 12 and the coding processing by the second coding unit 13 that are parallelized, and the coding processing by the first coding unit 12 and the coding processing by the second coding unit 13 are made to be performed independently of each other.

Figure 2:
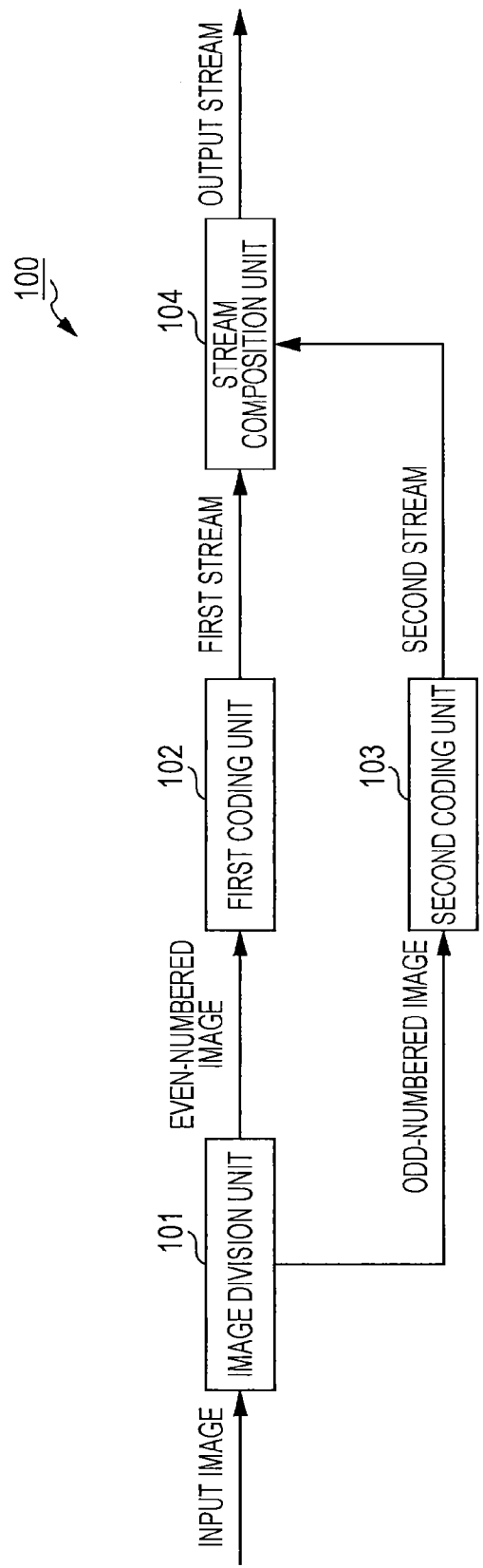
FIG. 2 is a block diagram illustrating another configuration example of the image coding device.

FIG. 2 is a block diagram illustrating one example of a configuration of an image coding device 100 according to a first embodiment of the present disclosure. The image coding device 100 illustrated in FIG. 2 divides an input image being a moving image into two arrangements for parallelization for every picture and codes the images in the two arrangements.

As illustrated in FIG. 2, the image coding device 100 includes an image division unit 101, a first coding unit 102, a second coding unit 103, and a stream composition unit 104.

The image division unit 101 alternately divides the input image into the two arrangements. That is, the image division unit 101 supplies an even-numbered picture of the input image (an even-numbered image) to the first coding unit 102 and supplies an odd-numbered picture (an odd-numbered image) to the second coding unit 103. Moreover, the input image hereinafter refers to a moving image (or a picture of the image) in one arrangement that is present before the division by the image division unit 101, which is input into the image coding device 100.

The first coding unit 102 codes a group of supplied even-numbered images as a moving image in one arrangement. For example, the first coding unit 102 generates a prediction image by performing an intra prediction that is the same as an advanced video coding (AVC) or high efficiency video coding (HEVC), or an inter-prediction, and generates a stream (first stream) by performing orthogonal transformation, quantification, or the like on the prediction image and a difference image of the even-numbered image that is input and performing reversible coding on the result. The first coding unit 102 supplies the generated first stream (code data on the group of even-numbered images) to the stream composition unit 104.

The second coding unit 103 performs the same coding on a group of supplied odd-numbered images as the first coding unit 102 and generates a second stream. The second coding unit 103 supplies the generated second stream (code data on the group of odd-numbered images) to the stream composition unit 104.

Figure 3:
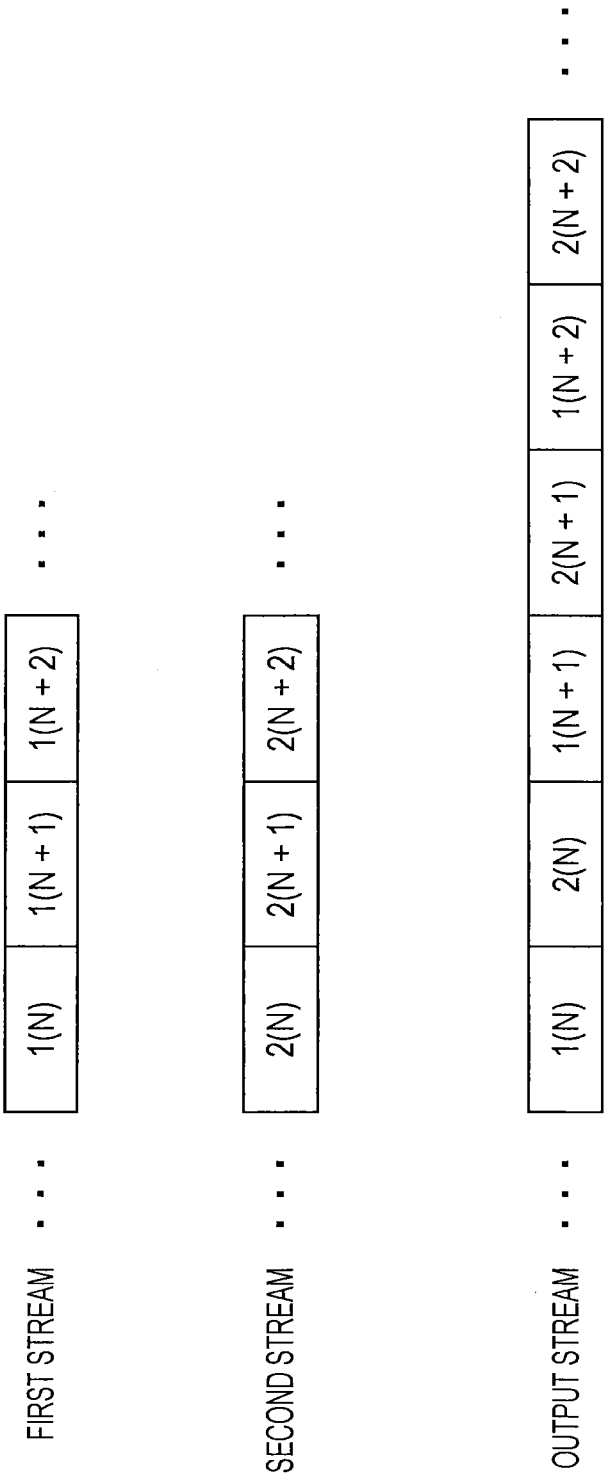
FIG. 3 is a diagram for describing a state where streams are composited.

The stream composition unit 104 composites the supplied first stream and second stream and generates an output stream in one arrangement. For example, as illustrated in FIG. 3, the stream composition unit 104 rearranges into one arrangement the code data on each even-numbered image included in the first stream and the code data on each odd-numbered image included in the second stream in an order in which the pictures are arranged in the input image, by alternately arranging the code data on each even-numbered image and the code data on each odd-numbered image.

At that time, the stream composition unit 104 generates header information on an output stream by properly combining header information on the first stream and header information on the second stream. Basically, by compositing the first stream and the second stream, the stream composition unit 104 generates the stream as when the input image is coded without the parallelization. The stream composition unit 104 outputs the generated output stream to outside of the image coding device 100.

Moreover, the first coding unit 102 and the second coding unit 103 can also perform the processing mutually in parallel. Basically, for example, while the first coding unit 102 codes the picture that is the input image, the second coding unit 103 can perform the coding on the next picture that is the input image. Furthermore, for example, while the second coding unit 103 codes the picture that is the input image, the first coding unit 102 can perform the coding on the next picture that is the input image. When done in this manner, each of the first coding unit 102 and the second coding unit 103 can use the vertical synchronization period for two pictures in coding one picture. In other words, the first coding unit 102 and the second coding unit 103 perform the coding on one picture within the vertical synchronization period for two pictures and thus can output the output stream without overflow in real time (promptly), that is, at a speed corresponding to a frame rate of the input image.

Basically, because the first coding unit 102 and the second coding unit 103 can perform the processing in parallel and thus can secure a longer time for the coding processing, the image coding device 100 can perform the coding in real time even though the input image may be, for example, a picture that has a great amount of data (a large number of pixels, a large number of bits, or the like) like a 4K image.

Furthermore, the delivering and receiving of the information, such as the reference image, between the first coding unit 102 and the second coding unit 103 is not performed. Therefore, the first coding unit 102 and the second coding unit 103 can perform the processing independently of each other without the dependence relationship occurring between the coding processing of the first coding unit 102 and the coding processing of the second coding unit 103.

First Coding Unit

Figure 4:
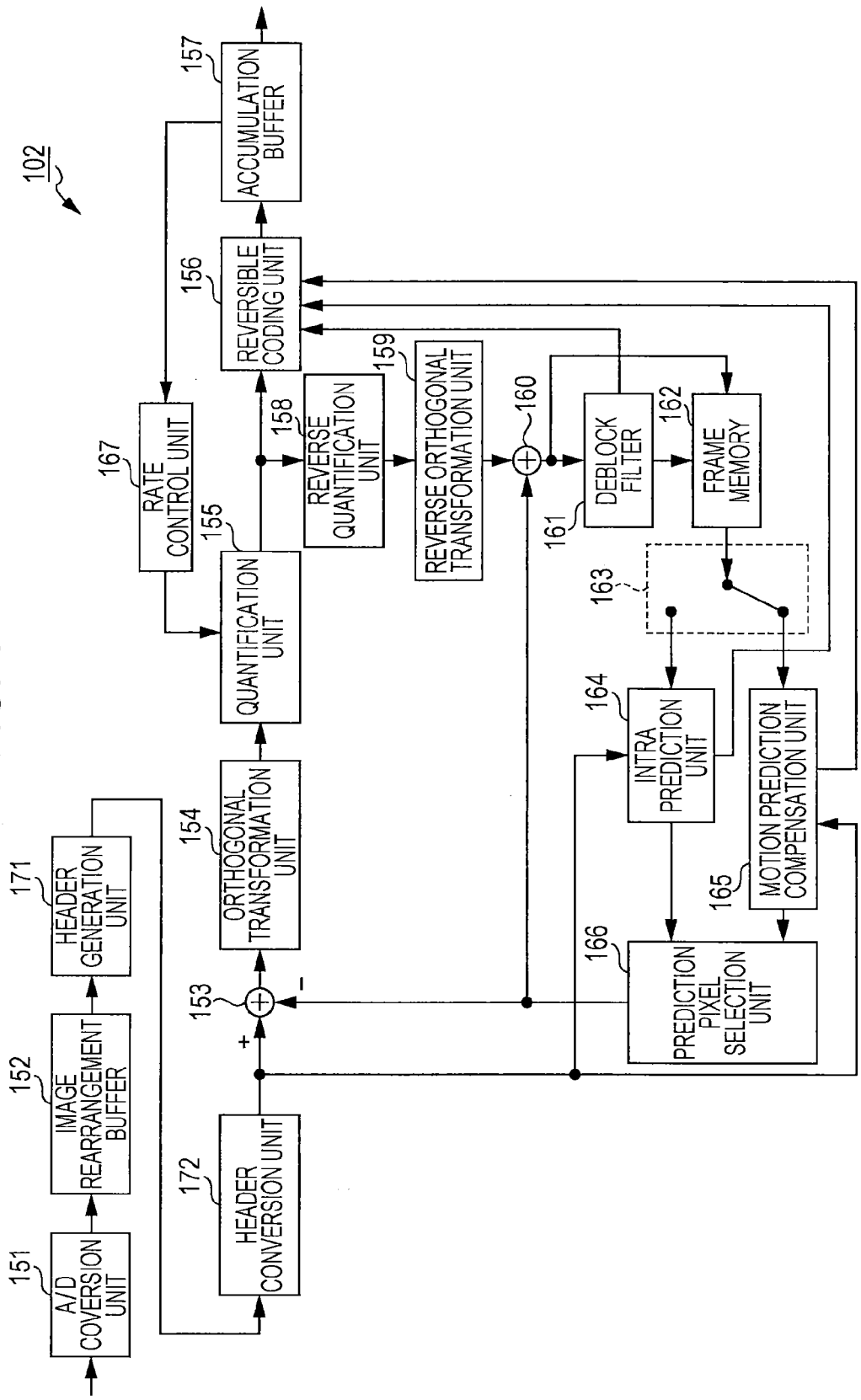
FIG. 4 is a block diagram illustrating a main configuration example of a first coding unit.

FIG. 4 is a block diagram illustrating a main configuration example of the first coding unit 102 in FIG. 2.

The first coding unit 102 illustrated in FIG. 4 codes the image data by performing prediction processing such as AVC or HEVC.

As illustrated in FIG. 4, the first coding unit 102 includes an A/D conversion unit 151, an image rearrangement buffer 152, an arithmetic operation unit 153, an orthogonal transformation unit 154, a quantification unit 155, a reversible coding unit 156, and an accumulation buffer 157. Furthermore, the first coding unit 102 includes a reverse quantification unit 158, a reverse orthogonal transformation unit 159, an arithmetic operation unit 160, a deblock filter 161, a frame memory 162, a selection unit 163, an intra prediction unit 164, a motion prediction and compensation unit 165, a prediction image selection unit 166, and a rate control unit 167.

The first coding unit 102 additionally has a header generation unit 171 and a header conversion unit 172.

The A/D conversion unit 151 performs A/D conversion on the image data that is input, and supplies and stores post-conversion image data (digital data) to and in the image rearrangement buffer 152. When the input image is a digital image, the A/D conversion unit 151 becomes unnecessary. According to a group of pictures (GOP), the image rearrangement buffer 152 rearranges the image in frames in the order of stored display, in a frame order for the coding, and supplies the image in a rearranged frame order to the arithmetic operation unit 153 through the header generation unit 171 and the header conversion unit 172. Furthermore, in the image rearrangement buffer 152, the image in the rearranged frame order is also supplied to the intra prediction unit 164 and the motion prediction and compensation unit 165.

The arithmetic operation unit 153 subtracts the prediction image that is supplied through the prediction image selection unit 166 from the intra prediction unit 164 or the motion prediction and compensation unit 165, from the image that is read from the image rearrangement buffer 152 and outputs the resulting difference information to the orthogonal transformation unit 154.

For example, if intra coding is performed on the image, the arithmetic operation unit 153 subtracts the prediction image that is supplied from the intra prediction unit 164, from the image that is read from the image rearrangement buffer 152. Furthermore, for example, if inter-coding is performed on the image, the arithmetic operation unit 153 subtracts the prediction image that is supplied from the motion prediction and compensation unit 165, from the image that is read from the image rearrangement buffer 152.

The orthogonal transformation unit 154 performs an orthogonal transformation, such as discrete cosine transformation or Karhunen-Loeve transformation, on the difference information that is supplied from the arithmetic operation unit 153. Moreover, such an orthogonal transformation method is arbitrary. The orthogonal transformation unit 154 supplies such a transformation coefficient to the quantification unit 155.

The quantification unit 155 quantifies the transformation coefficient that is supplied from the orthogonal transformation unit 154. The quantification unit 155 sets a quantification parameter based on the information relating to a target value of an amount of codes, which is supplied from the rate control unit 167 and performs quantification on the quantification parameter. Moreover, such a quantification method is arbitrary. The quantification unit 155 supplies the quantified transformation coefficient to the reversible coding unit 156.

The reversible coding unit 156 codes the transformation coefficient that is quantified in the quantification unit 155, using an arbitrary coding method. Because coefficient data is quantified under the control of the rate control unit 167, such an amount of codes is a target value that is set by the rate control unit 167 (or is near the target value).

Furthermore, the reversible coding unit 156 obtains from the intra prediction unit 164 information indicating an intra prediction mode or the like, and obtains from the motion prediction and compensation unit 165 information indicating an inter-prediction mode, motion vector information, or the like. Additionally, the reversible coding unit 156 can obtain a filter coefficient or the like that is used in the deblock filter 161.

The reversible coding unit 156 codes such various pieces of information using the arbitrary coding method and sets (multiplexes) the result of the coding to be one part of the header information on the code data. The reversible coding unit 156 supplies and accumulates the code data that is coded and obtained, to and in the accumulation buffer 157.

For example, variable-length coding, arithmetic coding, or the like may be enumerated as the coding method that is used by the reversible coding unit 156. For example, context-adaptive variable length coding (CAVLC) that is determined with an H.264/AVD method or the like may be enumerated as the variable-length coding. For example, context-adaptive binary arithmetic coding (CABAC) or the like may be enumerated as the arithmetic coding.

The accumulation buffer 157 temporarily retains the code data that is supplied from the reversible coding unit 156. The accumulation buffer 157 outputs the code data being retained, as a bit stream (the first stream), at a predetermined timing.

Furthermore, the transformation coefficient that is quantified in the quantification unit 155 is supplied also to the reverse quantification unit 158. The reverse quantification unit 158 reversely quantizes the quantified transformation coefficient using a method corresponding to the quantification by the quantification unit 155. Such a reverse quantification method may be whatever corresponds to the quantizing processing by the quantification unit 155. The reverse quantification unit 158 supplies the obtained transformation coefficient to the reverse orthogonal transformation unit 159.

The reverse orthogonal transformation unit 159 performs reverse orthogonal transformation on the transformation coefficient that is supplied from the reverse quantification unit 158, using a method corresponding to orthogonal transformation processing by the orthogonal transformation unit 154. Such a reverse orthogonal transformation method may be whatever corresponds to the orthogonal transformation processing by the orthogonal transformation unit 154. The output that goes through the reverse orthogonal transformation (the restored difference information) is supplied to the arithmetic operation unit 160.

The arithmetic operation unit 160 adds the prediction image that is supplied through the prediction image selection unit 166 from the intra prediction unit 164 or the motion prediction and compensation unit 165, to a result of the reverse orthogonal transformation that is supplied from the reverse orthogonal transformation unit 159, that is, to the restored difference information, and obtains a locally-decoded image (decode image). Such a decode image is supplied to the deblock filter 161 or the frame memory 162.

The deblock filter 161 removes a block distortion in a decode image by performing deblock filter processing on the decode image that is supplied from the arithmetic operation unit 160. If necessary, the deblock filter 161 supplies information, such as the filter coefficient, that is used in filter processing, to the reversible coding unit 156 and can code such information.

The deblock filter 161 supplies a result of the filter processing (the decode image after the filter processing) to the frame memory 162. Moreover, as described above, the decode image that is output from the arithmetic operation unit 160 can be supplied to the frame memory 162 without passing through the deblock filter 161. Basically, the filter processing by the deblock filter 161 can be omitted.

The frame memory 162 stores the supplied decode image, and at a predetermined timing, supplies the stored decode image, as the reference image, to the selection unit 163.

The selection unit 163 selects a supply destination of the reference image that is supplied from the frame memory 162. For example, in a case of the intra prediction, the selection unit 163 supplies the reference image that is supplied from the frame memory 162, to the intra prediction unit 164. Furthermore, for example, in a case of the inter-prediction, the selection unit 163 supplies the reference image that is supplied from the frame memory 162, to the motion prediction and compensation unit 165.

The intra prediction unit 164 performs the intra prediction (inter-image prediction) in which the prediction image is generated using a pixel value within a current picture that is the reference image which is supplied through the selection unit 163 from the frame memory 162. The intra prediction unit 164 performs such an intra prediction in multiple modes (intra prediction mode) that are prepared in advance.

The intra prediction unit 164 generates the prediction image in all the intra prediction modes that are candidates, evaluates a cost function value of each prediction image using the input image that is supplied from the image rearrangement buffer 152, and selects an optimal mode. When the optimal intra prediction mode is selected, the intra prediction unit 164 supplies the prediction image being generated in such an optimal mode to the prediction image selection unit 166.

Furthermore, as described above, the intra prediction unit 164 supplies intra prediction mode information indicating the employed intra prediction mode and the like to the proper reversible coding unit 156 and codes such information.

The motion prediction and compensation unit 165 performs motion prediction (inter-prediction) using the input image that is supplied from the image rearrangement buffer 152 and the reference image that is supplied through the selection unit 163 from the frame memory 162, performs motion compensation processing according to the detected motion vector, and generates the prediction image (inter-prediction image information). The motion prediction and compensation unit 165 performs such an inter-prediction in the multiple modes (inter-prediction mode) that are prepared in advance.

The motion prediction and compensation unit 165 generates the prediction image in all the inter-prediction modes that are candidates, evaluates the cost function value of each prediction image, and selects the optimal mode. When the optimal inter-prediction mode is selected, the motion prediction and compensation unit 165 supplies the prediction image being generated in such an optimal mode to the prediction image selection unit 166.

Furthermore, when decoding the information indicating the employed inter-prediction mode or the code data, the motion prediction and compensation unit 165 supplies information necessary for performing the processing in such an inter-prediction mode and the like to the reversible coding unit 156 and codes such information and the like.

The prediction image selection unit 166 selects the supply destination of the prediction image that is supplied to the arithmetic operation unit 153 or the arithmetic operation unit 160. For example, in a case of the intra coding, the prediction image selection unit 166 selects the intra prediction unit 164 as the supply destination of the prediction image, and supplies the prediction image that is supplied from the intra prediction unit 164, to the arithmetic operation unit 153 or the arithmetic operation unit 160. Further, for example, in a case of the inter-coding, the prediction image selection unit 166 selects the motion prediction and compensation unit 165 as the supply destination of the prediction image, and supplies the prediction image that is supplied from the motion prediction and compensation unit 165, to the arithmetic operation unit 153 or the arithmetic operation unit 160.

The rate control unit 167 controls a rate of a quantification operation by the quantification unit 155 in such a manner that overflow or underflow does not occur, based on the amount of codes of the code data that is accumulated in the accumulation buffer 157.

The header generation unit 171 generates the header information on the first stream, based on the group of even-numbered images being supplied and the like. Basically, the header generation unit 171 generates the header information on an arrangement for the group of even-numbered images. The header generation unit 171 supplies the group of even-numbered images and the like to the header conversion unit 172, along with the generated header information.

Information relating to an arrangement (a different arrangement) for the group of odd-numbered images is not included in such header information. Therefore, such header information, for example, the number of the pictures, the number of the reference pictures that refer to the information, or the like, is assigned only with the even-numbered image. Therefore, each of the numbers does not correspond to the number in the output stream that results after the composition by the stream composition unit 104. Therefore, a syntax relating to a number of the pictures or of the reference pictures, which is included in the header information generated by the header generation unit 171, is also difficult to use, as it is, in the output stream.

The header conversion unit 172 converts the header information that is supplied from the header generation unit 171, in such a manner that the header information can be used in the output stream, that is, in such a manner that the output stream that results after the composition becomes normal.

For example, as illustrated in FIG. 5, the successively-numbered pictures in the group of even-numbered pictures in the arrangement for the group of even-numbered images are numbered every other picture in an arrangement for a group of original images. Furthermore, reference to the immediately-preceding picture in the arrangement for the group of even-numbered images corresponds to reference to the picture that precedes by two pictures in the arrangement for the group of original images. Moreover, reference to the picture that precedes by two pictures in the arrangement for the group of even-numbered images corresponds to reference to the picture that precedes by four pictures in the arrangement for the group of original images.

The header conversion unit 172 updates information (for example, information relating to identification of the picture or the reference picture and the like) relating to the picture or the reference picture, of the header information, according to such a correspondence relationship between the original image and the even-numbered image. The header conversion unit 172 supplies the group of even-numbered images to the arithmetic operation unit 153, the intra prediction unit 164, the motion prediction and compensation unit 165, and the like, and supplies the header information whose information is updated, to the reversible coding unit 156 through the arithmetic operation unit 153 to the quantification unit 155.

The reversible coding unit 156 adds the supplied header information to the generated code data (the first stream) and outputs the result to the stream composition unit 104 through the accumulation buffer 157.

Second Coding Unit

Moreover, the second coding unit 103 is the same processing unit as the first coding unit 102 except that the odd-numbered image is coded instead of the even-numbered image and the second stream is output instead of the first stream, and performs the same coding as the first coding unit 102. Basically, the second coding unit 103 has the same configuration as the first coding unit 102 (refer to FIG. 4). Therefore, FIG. 4 can be referred to when the second coding unit 103 is described.

For example, the header generation unit 171 of the second coding unit 103 generates the header information on the second stream, based on the supplied group of odd-numbered images and the like. Basically, in this case, the header generation unit 171 generates the header information on an arrangement for the group of odd-numbered images. The header generation unit 171 supplies the group of the odd-numbered images and the like to the header conversion 172, along with the generated header information.

The header conversion unit 172 of the second coding unit 103 converts the header information that is supplied from the header generation unit 171, in such a manner that the header information can be used in the output stream, that is, in such a manner that the output stream that results after the composition becomes normal.

Figure 6:
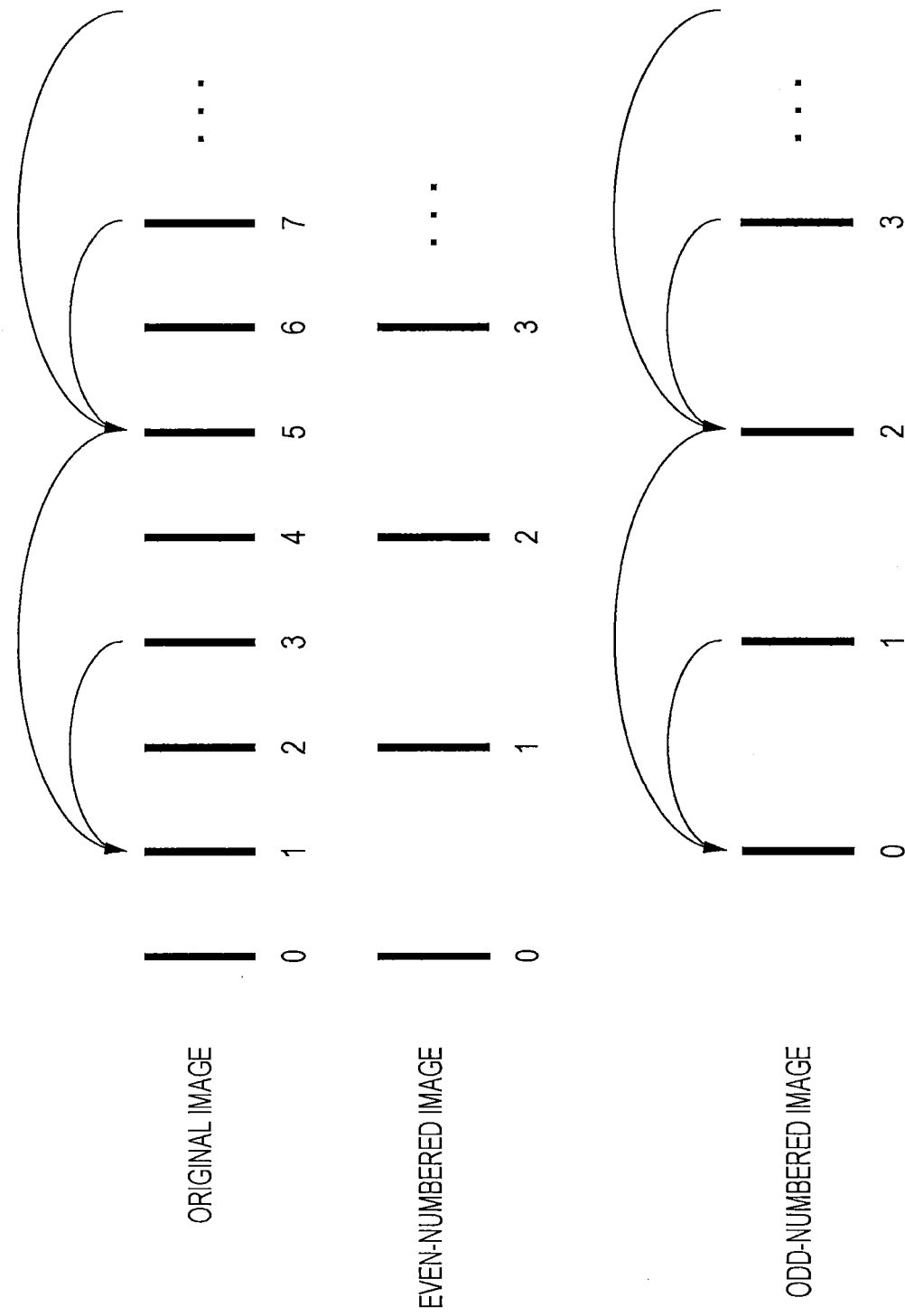
FIG. 6 is a diagram for describing the reference relationship between the original image and an odd-numbered image.

For example, as illustrated in FIG. 6, the successively-numbered pictures in the group of odd-numbered pictures in the arrangement for the group of odd-numbered images are numbered every other picture in the arrangement for the group of original images. Furthermore, reference to the immediately-preceding picture in the arrangement for the group of odd-numbered images corresponds to reference to the picture that precedes by two pictures in the arrangement for the group of original images. Moreover, reference to the picture that precedes by two pictures in the arrangement for the group of odd-numbered images corresponds to reference to the picture that precedes by four pictures in the arrangement for the group of original images.

The header conversion unit 172 updates the information (for example, the information relating to the identification of the picture or the reference picture and the like) relating to the picture or the reference picture, of the header information, according to such a correspondence relationship between the original image and the odd-numbered image. The header conversion unit 172 supplies the group of odd-numbered images to the arithmetic operation unit 153, the intra prediction unit 164, and the motion prediction and compensation unit 165, and supplies the header information whose information is updated, to the reversible coding unit 156 through the arithmetic operation unit 153 to the quantification unit 155.

The reversible coding unit 156 of the second coding unit 103 adds the supplied header information to the generated code data (the second stream) and outputs the result to the stream composition unit 104 through the accumulation buffer 157.

Stream Composition Unit

As described above, the header information that is converted into the information that is available in the output terminal is included in the first stream and the second stream that are supplied to the stream composition unit 104. Therefore, the stream composition unit 104 can easily generate the header information for the output stream that results after the composition, based on the header information that is included in the first stream and the second stream. Basically, the stream composition unit 104 easily composites the first stream and second stream and thus can generate the output stream.

Making the Coding Processing Easy

Therefore, the first coding unit 102 and the second coding unit 103 can perform the coding processing independently of each other without the mutual dependence relationship occurring. Basically, it is not necessary to control the coding processing of the first coding unit 102 and the coding processing of the second coding unit 103 in an integrated manner. Therefore, the image coding device 100 can perform the coding of the image more easily without the complicated control. Furthermore, accordingly, the increase in the development cost can be suppressed.

Furthermore, it is also not necessary to ensure a broad band as a communication path between the first coding unit 102 and the second coding unit 103. Therefore, the increase in the hardware cost can be suppressed.

Syntax to be Updated

A change in the header information is described in more detail. The header conversion units 172 of the first coding unit 102 and the second coding unit 103 change, for example, syntax parameters illustrated in FIG. 7 as the information relating to the picture or the reference picture.

As illustrated in FIG. 7, the header conversion unit 172 changes, for example, num_ref_idx_l0_active_minus 1 of a picture parameter (pic parameter set). If a value of num_ref_idx_active_override_flag is 0, the num_ref_idx_l0_active_minus 1 stipulates a maximum value of a reference index in a reference picture list. A result of adding 1 to the value is the maximum value of the reference index. The header conversion unit 172 changes information relating to such a reference picture in such a manner that the information becomes normal in the output stream, based on the relationship that is illustrated in FIG. 5 or 6.

Furthermore, as illustrated in FIG. 7, the header conversion unit 172 changes, for example, cpb_removal_delay of picture timing SEI (Supplemental Enhancement Information). The cpb_removal_delay is information relating to a point in time at which reading from a coded picture buffer (CPB) is performed and is indicated with a delay from initial point-in-time information. The header conversion unit 172 changes information relating to such a reference picture in such a manner that the information becomes normal in the output stream, based on the relationship that is illustrated in FIG. 5 or 6.

Furthermore, as illustrated in FIG. 7, the header conversion unit 172 changes, for example, frame_num of a slice header. The frame_num is used as an identifier of a short-term reference picture. The header conversion unit 172 changes information relating to such a reference picture in such a manner that the information becomes normal in the output stream, based on the relationship that is illustrated in FIG. 5 or 6.

Furthermore, as illustrated in FIG. 7, the header conversion unit 172 changes, for example, pic_order_cnt_lsb of the slice header. The pic_order_cnt_lsb is used in calculating a picture order count (POC) that is information indicating an order in which the pictures are output. The header conversion unit 172 changes information relating to such a picture in such a manner that the information becomes normal in the output stream, based on the relationship that is illustrated in FIG. 5 or 6.

Furthermore, as illustrated in FIG. 7, the header conversion unit 172 changes, for example, the num_ref_idx_l0_active_minus 1 of the slice header. The num_ref_idx_l0_active_minus 1 indicates a maximum reference index value of the reference picture list. The header conversion unit 172 changes information relating to such a reference picture in such a manner that the information becomes normal in the output stream, based on the relationship that is illustrated in FIG. 5 or 6.

Furthermore, as illustrated in FIG. 7, the header conversion unit 172 changes, for example, ref_pic_list_reordering_flag_10 of the slice header. The ref_pic_list_reordering_flag_10 is information that indicates whether or not to perform rearranging of the reference picture list. If the value is 1, the rearranging of the reference picture list is performed. The header conversion unit 172 changes information relating to the rearranging of such a reference picture list in such a manner that the information becomes normal in the output stream, based on the relationship that is illustrated in FIG. 5 or 6.

Furthermore, as illustrated in FIG. 7, the header conversion unit 172 changes, for example, reordering of pic_nums_idc of the slice header. The reordering of pic_nums_idc is syntax that designates which picture index to be rearranged belongs to and that relates to control of the rearranging of the reference picture list. The header conversion unit 172 changes information relating to such a reference picture in such a manner that the information becomes normal in the output stream, based on the relationship that is illustrated in FIG. 5 or 6.

Furthermore, as illustrated in FIG. 7, the header conversion unit 172 changes, for example, abs_diff_pic_num_minus 1 of the slice header. The abs_diff_pic_num_minus 1 indicates an absolute value of a difference between a picture number of the picture that is moved to a current index of the reference picture list and a prediction value of the picture number. That is, the abs_diff_pic_num_minus 1 designates the picture that is designated to the current index. The header conversion unit 172 changes information relating to such a reference picture in such a manner that the information becomes normal in the output stream, based on the relationship that is illustrated in FIG. 5 or 6.

Since the header conversion unit 172 changes various pieces of information in this manner, the first coding unit 102 and the second coding unit 103 can perform the coding processing independently of each other and the image coding device 100 can perform the coding of the image more easily.

Of course, the image coding device 100 may change parameters and the like other than those described above.

GOP

The first coding unit 102 codes the group of even-numbered images according to a group-of-pictures (GOP) structure and generates the first stream. In the same manner, the second coding unit 103 codes the group of odd-numbered images according to the GOP structure and generates the first stream. The stream composition unit 104 composites the first stream and the second stream in such a manner that the output stream becomes a stream that is obtained by coding the input image according to the GOP structure. Basically, for example, the first stream and the second stream are composited as illustrated in FIG. 3. At this time, a front picture of the GOP of the first stream becomes a front picture of the GOP in the output stream, and a front picture of the GOP of the second stream does not become a front picture of the GOP in the output stream.

Figure 8:
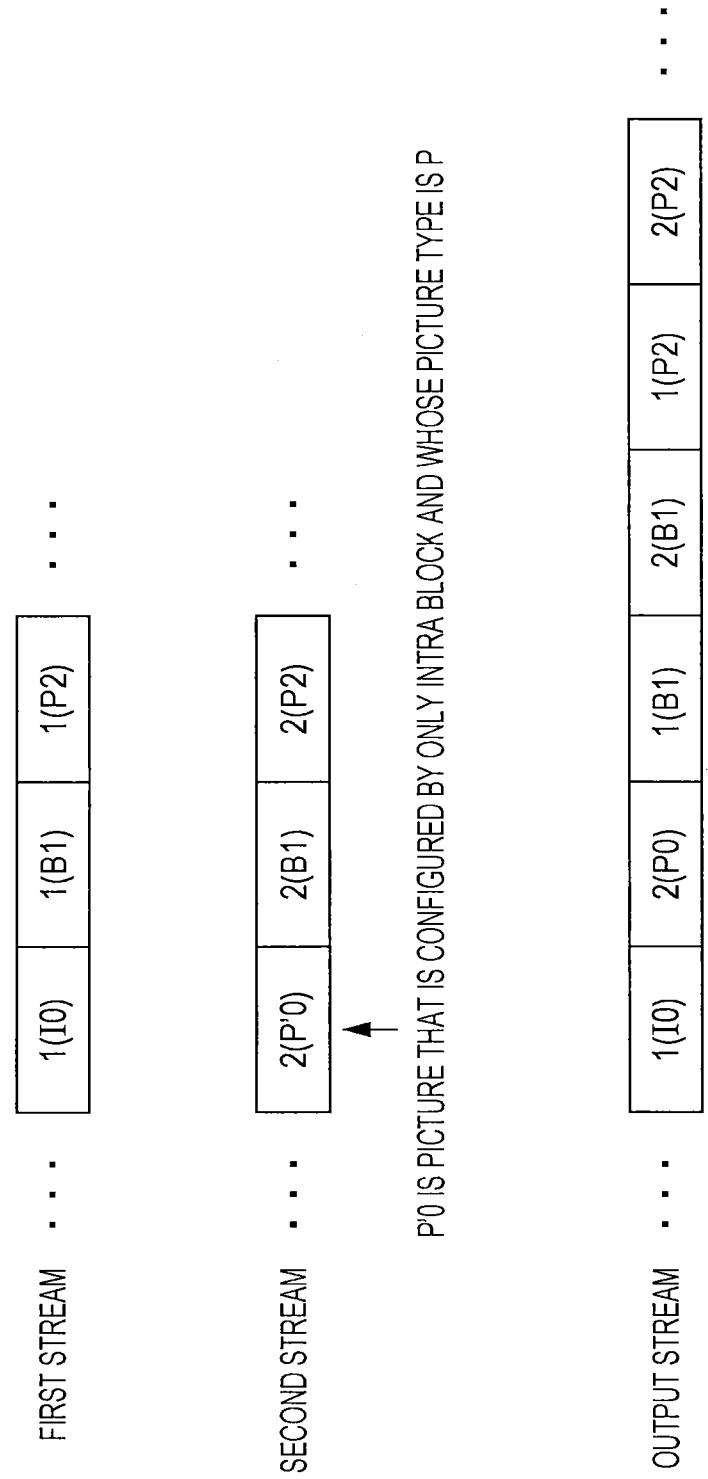
FIG. 8 is a diagram illustrating a configuration example of the stream.

Accordingly, the second coding unit 103, as illustrated in FIG. 8, codes the front picture of the GtOP of the second stream as a P picture that is configured only from intra blocks, not as an I picture (2 (P'0) in FIG. 8). When done in this manner, the stream composition unit 104 can easily composite the first stream and the second stream in such a manner that the output stream, as illustrated in FIG. 8, is brought into the normal GOP structure.

Flow of the Processing

Next, a flow of the processing that is performed by the image coding device 100 is described.

Flow of Parallel Coding Processing

Figure 9:
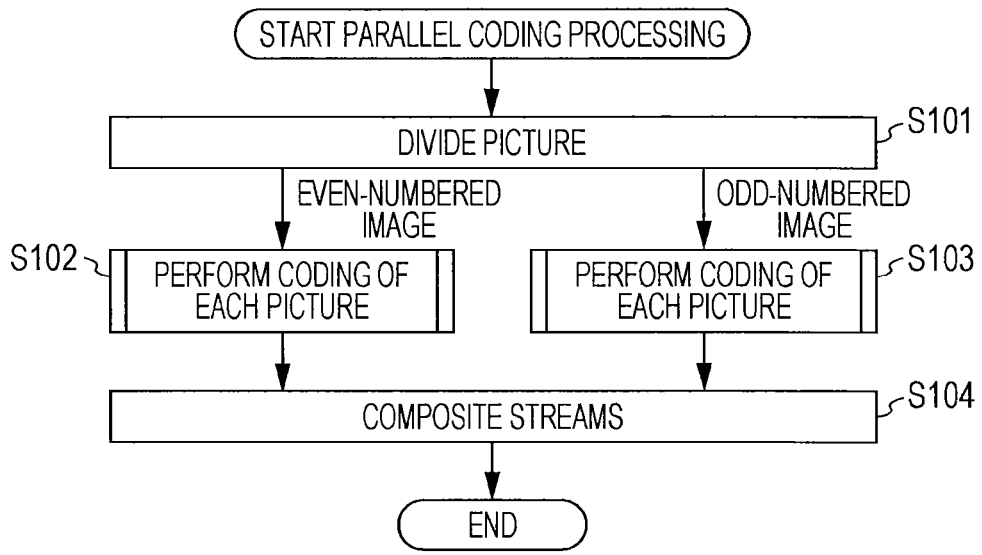
FIG. 9 is a diagram for describing an example of a flow of parallel coding processing.

An example of a flow of parallel coding processing that is performed by the image coding device 100 is described referring to a flow chart in FIG. 9.

In Step S101, the image division unit 101 of the image coding device 100 sequentially divides each picture of the input image into an even-numbered image and an odd-numbered image. Processing in Step S102 is performed on the even-numbered image, and processing in Step S103 is performed on the odd-numbered image. The processing in Step 102 that is performed on the even-numbered image and the processing in Step S103 that is performed on the odd-numbered image can be performed mutually in parallel.

In Step S102, the first coding unit 102 codes each picture of the even-numbered image that is input. When the processing in Step S102 is finished, the processing proceeds to Step S104. Furthermore, in Step S103, the second coding unit 103 codes each picture of the odd-numbered image that is input. When the processing in Step S103 is finished, the processing proceeds to Step S104.

In Step S104, the stream composition unit 104 composites a first stream that is generated by the processing in Step S102 and a second stream that is generated by the processing in Step S103, and generates an output stream. Moreover, the stream composition unit 104 may sequentially composite the streams of each picture that are supplied. Basically, the processing in Step S104 may be performed in parallel with the processing in Step S102 or S103.

When the first stream and the second stream are all composited and the processing in Step S104 is finished, the parallel coding processing is finished.

Flow of Even-numbered Image Coding Processing

Figure 10:
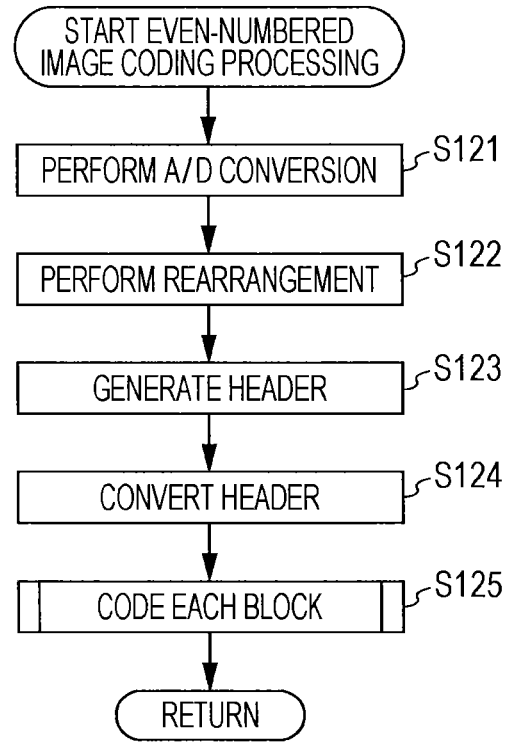
FIG. 10 is a flow chart illustrating an example of a flow of even-numbered image coding processing.

Next, an example of a flow of even-numbered image coding processing that is performed in Step S102 in FIG. 9 is described referring to a flow chart in FIG. 10.

When the even-numbered coding processing starts, in Step S121, the A/D conversion unit 151 of the first coding unit 102 performs the A/D conversion on the even-numbered image that is input. In Step S122, the image rearrangement buffer 152 of the first coding unit 102 stores the image on which the A/D conversion is performed, and if necessary, rearranges the pictures in such a manner that the order in which the pictures are displayed is changed to the order in which the pictures are coded.

In Step S123, the header generation unit 171 generates the header information on the first stream (the even-numbered image). In Step S124, the header conversion unit 172 converts the header information generated in Step S123, in such a manner that the output stream becomes normal.

In Step S125, the first coding unit 102 codes the current picture that is a processing target, for every block. Moreover, the first coding unit 102 performs the processing operations in Steps S121 to S125 on each picture (each even-numbered image).

When the processing operations in Step S121 to S125 are performed on all the pictures, the even-numbered image coding processing is finished and the processing returns to the flow chart in FIG. 9.

Flow of Block Coding Processing

Figure 11:
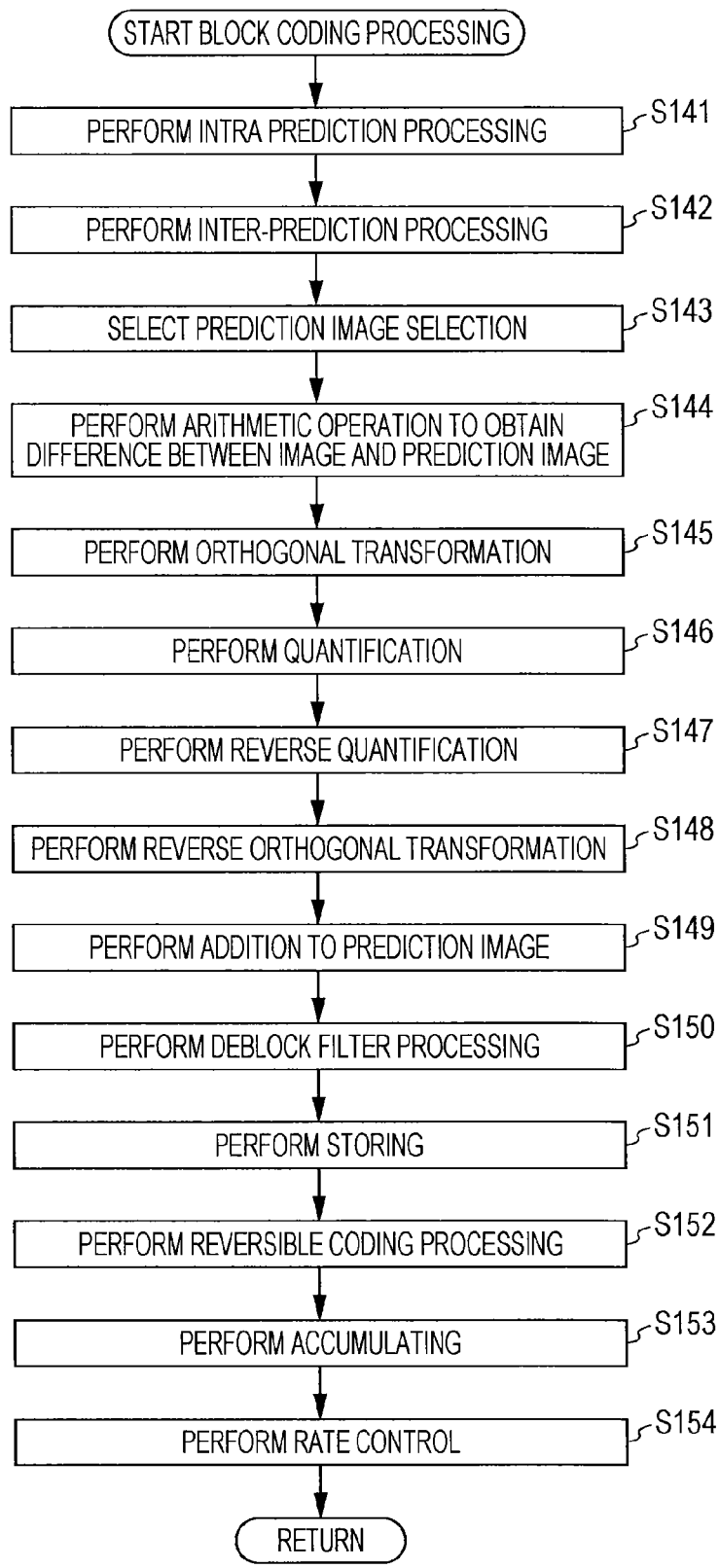
FIG. 11 is a flow chart illustrating an example of a flow of block coding processing.

Next, an example of a flow of block coding processing that is performed in Step S125 in FIG. 10 is described referring to a flow chart in FIG. 11.

When the block coding processing starts, in Step S141, the intra prediction unit 164 performs intra prediction processing in the intra prediction mode. In Step S142, the motion prediction and compensation unit 165 performs inter-motion-prediction processing that performs the motion prediction or motion compensation in the inter-prediction mode.

In Step S143, the prediction image selection unit 166 determines an optimal prediction mode, based on each cost function value that is output from the intra prediction unit 164 and the motion prediction and compensation unit 165. Basically, the prediction image selection unit 166 selects either of the prediction image that is generated by the intra prediction unit 164 or the prediction image that is generated by the motion prediction and compensation unit 165.

In Step S144, the arithmetic operation unit 153 performs the arithmetic operation to obtain a difference between the image that is rearranged and the prediction image that is selected by the processing in Step S143. There is less difference data in terms of an amount of data, compared to original image data. Therefore, an amount of data can be compressed, compared to a case where the image, as is, is coded.

In Step S145, the orthogonal transformation unit 154 performs the orthogonal transformation on the difference information that is generated by the processing in Step S144. More specifically, the orthogonal transformation, such as the discrete cosine transform, or the Karhunen-Loeve transformation is performed and the transformation coefficient is output. In Step S146, the quantification unit 155 performs quantification on an orthogonal transformation coefficient that is obtained by the processing in Step S145.

The difference information that is quantified by the processing in Step S146 is locally decoded as follows. That is, in Step S147, the reverse quantification unit 158 reversely quantifies the orthogonal transformation coefficient that is quantified by the processing in Step S146 using a method that corresponds to the quantization in Step S146. In Step S148, the reverse orthogonal transformation unit 159 performs the reverse orthogonal transformation on the orthogonal transformation coefficient that is obtained by the processing in Step S147 using a method that corresponds to the processing in Step S145.

In Step S149, the arithmetic operation unit 160 adds the prediction image to the difference information that is locally decoded and generates the image (the image that corresponds to the input to the arithmetic operation unit 153) that is locally decoded. In Step S150, the deblock filter 161 performs the deblock filter processing on the image that is generated by the processing in Step S149. By doing this, the block distortion is removed.

In Step S151, the frame memory 162 stores the image on which the block distortion and the like are performed by the processing in Step S150. Moreover, the image on which the filter processing is not performed by the deblock filter 161 is supplied from the arithmetic operation unit 160 to the frame memory 162 and is stored in the frame memory 162. The image that is stored in the frame memory 162 is used in the processing in Step S141 or the processing in Step S142.

In Step S152, the reversible coding unit 156 codes the transformation coefficient that is quantified by the processing in Step S146 and generates the code data. That is, the reversible coding, such as the variable-length coding or the arithmetic coding, is performed on the difference image (a second difference image in a case of the inter-prediction)

Moreover, the reversible coding unit 156 adds to the code data the header information that is generated in Step S123 in FIG. 10 and that is converted in Step S124.

Furthermore, the reversible coding unit 156 decodes the information relating to the prediction mode of the prediction image that is selected by the processing in Step S143, and adds to the code data that is obtained by coding the difference image. For example, if the intra prediction mode is selected, the reversible coding unit 156 codes the intra prediction mode information. Furthermore, for example, if the inter-prediction mode is selected, the reversible coding unit 156 codes inter-prediction mode information. Such information, for example, is added (multiplexed), as the header information and the like, to the code data.

In Step S153, the accumulation buffer 157 accumulates the code data that is generated by the processing in Step S152. The code data that is accumulated in the accumulation buffer 157 is properly read and is output, as the first stream, to the stream composition unit 104.

In Step S154, the rate control unit 167 controls the rate of the quantization operation by the quantification unit 155 in such a manner that the overflow or the underflow does not occur, based on compression data that is accumulated, by the processing in Step S153, in the accumulation buffer 157.

The first coding unit 102 performs a sequence of processing operations described above on each block of the current picture. When all the pictures are coded in this manner, the coding processing is finished and the processing returns to the flow chart in FIG. 10.

Flow of Odd-Numbered Image Coding Processing

Figure 12:
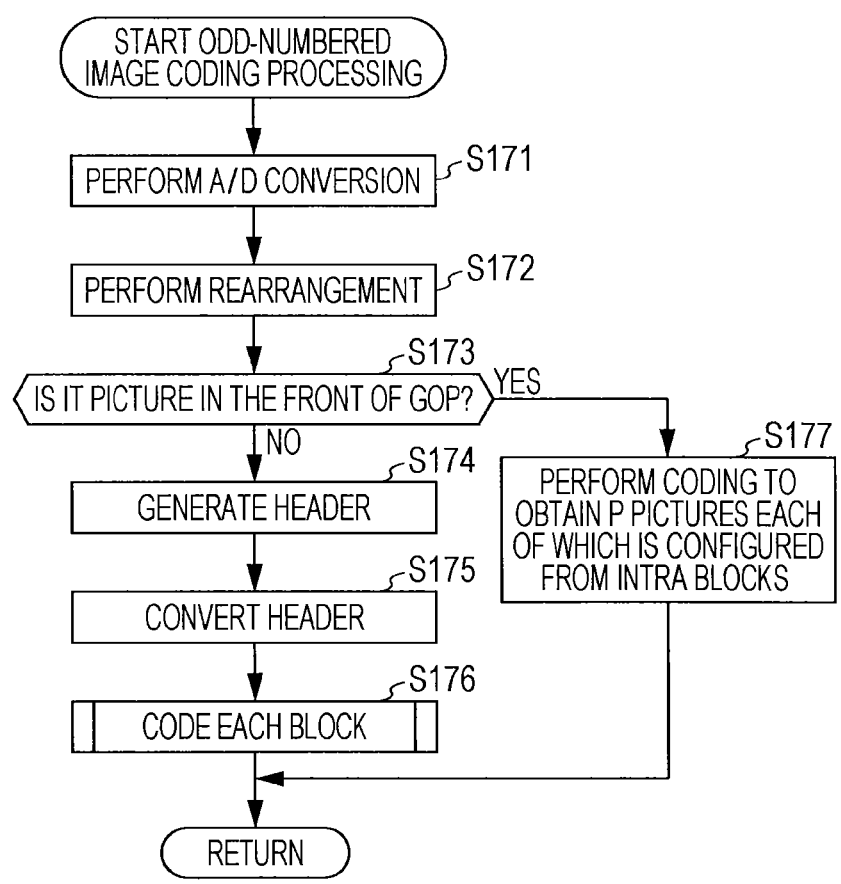
FIG. 12 is a flow chart illustrating an example of a flow of odd-numbered image coding processing.

Next, an example of a flow of odd-numbered image coding processing that is performed in Step S103 in FIG. 9 is described referring to a flow chart in FIG. 12.

When the odd-numbered image coding processing starts, in Step 171, the A/D conversion unit 151 of the second coding unit 103 performs the A/D conversion on the odd-numbered image that is input. In Step S172, the image rearrangement buffer 152 of the second coding unit 103 stores the image on which the A/D conversion is performed, and if necessary, rearranges the pictures in such a manner that the order in which the pictures are displayed is changed to the order in which the pictures are coded.

In Step S173, the second coding unit 103 determines whether or not the current picture that is the processing target is the front picture of the GOP. If it is determined that the current picture is not the processing target, the processing proceeds to Step S174.

In Step S174, the header generation unit 171 of the second coding unit 103 generates the header information on the second stream (the odd-numbered image). In Step S175, the header conversion unit 172 of the second coding unit 103 converts the header information that is generated in Step S174, in such a manner that the output stream becomes normal.

In Step S176, the second coding unit 103 codes the current picture that is the process target, for every block. The second coding unit 103 performs the block coding processing, which is basically the same as that in the flow chart in FIG. 11, on the current picture of the odd-numbered image and outputs the second stream.

Furthermore, in Step S173, if it is determined that the current picture that is the processing target is the front picture of the GOP, the processing proceeds to Step S177. In Step S177, the second coding unit 103 codes the current blocks as the P picture that is entirely configured from inter macro blocks. Basically, the second coding unit 103 performs the same processing as in Step S174 on all the blocks and thus generates the header information on the second stream (the odd-numbered image), and performs the processing as in Step S175 and thus converts the generated header information in such a manner that the output stream becomes normal. Then, the second coding unit 103 generates the prediction image by the intra prediction and performs the block coding processing that is basically the same as that in the flow chart in FIG. 11 except for the generation of such prediction image and outputs the second stream. The second coding unit 103 codes all the blocks of the current picture using the intra prediction in this manner. When the coding of the front picture of the GOP is finished, the processing in Step S177 is finished.

The second coding unit 103 performs a sequence of processing operations described above on each picture (each odd-numbered image). When the sequence of processing operations is performed on all the pictures, the odd-numbered image coding processing is finished and the processing returns to the flow chart in FIG. 9.

By performing each processing as described above, the image coding device 100 can perform the coding of the image more easily.

2. Second Embodiment

Image Coding Device

The case where the input image is divided into the two arrangements, one for the even-numbered image and the other for the odd-numbered image is described above, but the input image can be divided into an arbitrary number of arrangements. That is, the input image may be divided into three arrangements. Basically, the number of the coding units that perform the coding independently of one another is arbitrary without being limited to 2 and for example, may be 3 or greater.

Figure 13:
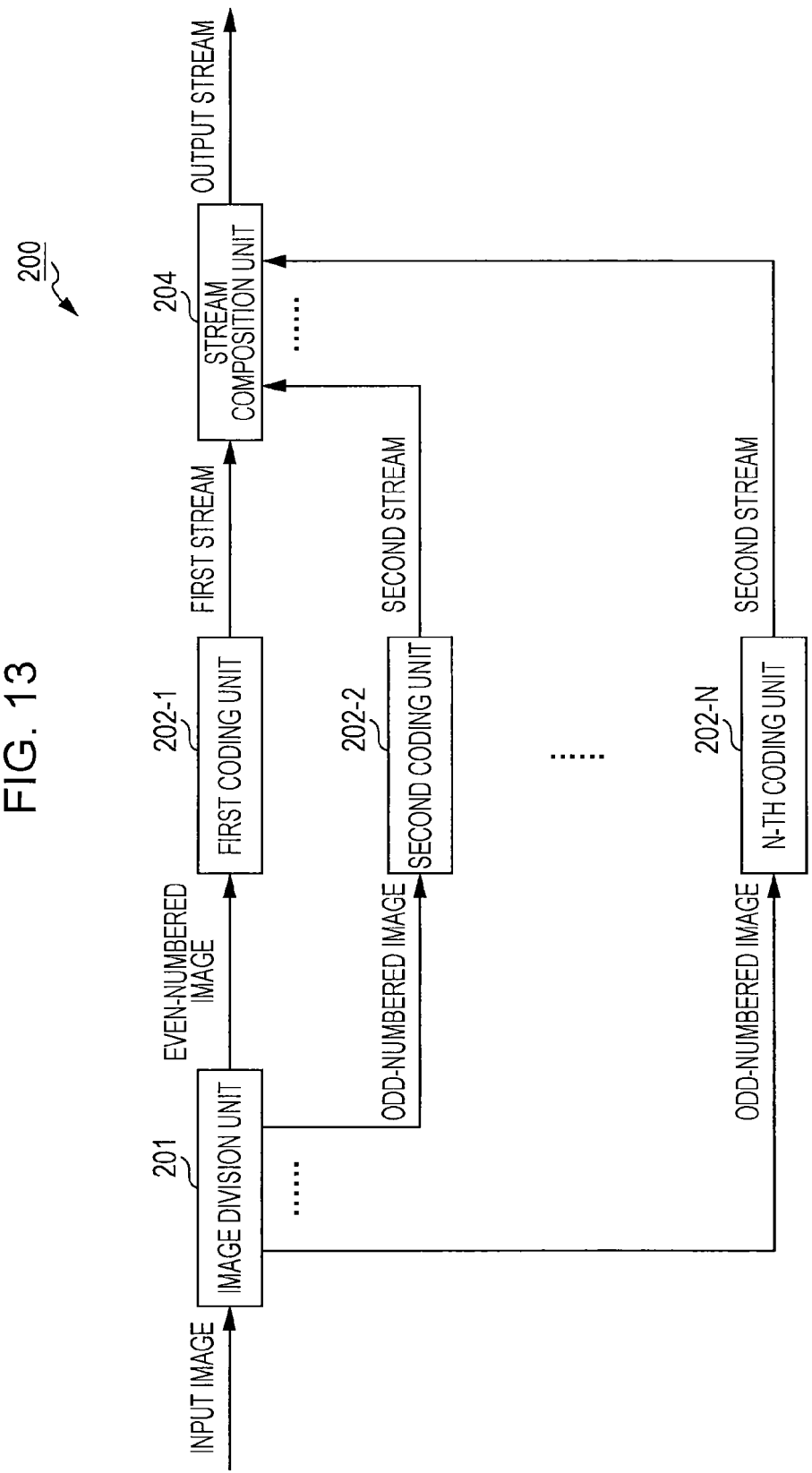
FIG. 13 is a block diagram illustrating another configuration example of the image coding device.

For example, as illustrated in FIG. 13, the image coding device 200 includes an image division unit 201, N (N is an integer equal to or greater than 3) coding units (a first coding unit 202-1, a second coding unit 202-2, and so forth up to an N-th coding unit 202-N), and a stream composition unit 204.

The image division unit 201 sequentially divides the pictures of the input image for the first coding unit 202-1 to the N-th coding unit 202-N and supplies the resulting pictures (divides the pictures into the N arrangements). That is, the image division unit 201 supplies the 0-th picture of the input image to the first coding unit 202-1, the first picture of the input image to the second coding unit 202-2, and so forth up to the (N−1)-th picture of the input image to the N-th coding unit 202-N. Then, the image division unit 201 supplies the N-th picture of the input image to the first coding unit 202-1. Subsequently, the division is performed in the same manner.

The first coding unit 202-1 to the N-th coding unit 202-N can perform the coding in parallel independently of one another in the same manner as the first coding unit 102 and the second coding unit 103 of the image coding device 100. For example, the first coding unit 202-1 codes each picture in the first arrangement, which is supplied from the image division unit 201, and generates the first stream. Furthermore, for example, the second coding unit 202-2 codes each picture in the second arrangement, which is supplied from the image division unit 201, and generates the second stream. Moreover, for example, the N-th coding unit 202-N codes each picture in the N-th arrangement, which is supplied from the image division unit 201, and generates the N-the stream. The first stream to the N-th stream are supplied to the stream composition unit 204.

The stream composition unit 204 composites the first stream to the N-th stream that are supplied, and generates and outputs the output stream.

Also in this case, the first coding unit 202-1 to the N-th coding unit 202-N perform the coding without delivering and receiving the information between the coding units, in the same manner as the first coding unit 102 and the second coding unit 103 of the image coding device 100. Furthermore, the first coding unit 202-1 to the N-th coding unit 202-N generate the header information on each stream and convert such header information in such a manner that the output stream becomes normal. When done in this manner, the image coding device 200 can easily perform the coding of the image in the same manner as the image coding device 100.

Moreover, each of the first coding unit 202-1 to the N-th coding unit 202-N codes the picture that is the front picture of the GOP in the arrangement that is assigned to each of the first coding unit 202-1 to the N-th coding unit 202-N, but is not the front picture of the GOP in the input image (the output stream), as the P picture that is entirely configured from the intra macro blocks. For example, if only the first coding unit 202-1 codes the front picture of the GOP in the input image (the output stream), the first coding unit 202-1 codes the front picture of the GOP in the input image (the output stream) as the I picture. In contrast, each of the second coding unit 202-2 to the N-th coding unit 202-N codes the front picture of the GOP in such an arrangement, as the P picture that is entirely configured from the intra macro blocks. When done in this manner, the stream composition unit 204 of the image coding device 200 can easily composite the streams in such a manner that the output stream is brought into the GOP structure that is illustrated in FIG. 8, in the same manner as the stream composition unit 104 of the image coding device 100.

Others

Moreover, for description convenience, the header generation unit 171 is described above as first generating the header information on such an arrangement and the header conversion unit 172 as converting such header information in a manner that it can be used in the output stream. However, without being limited to this, for example, the header generation unit 171 may generate the header information (that is, what is equivalent to the header information that is output by the header conversion unit 172) that can be used in the output stream. In such a case, the header conversion unit 172 (Step S124 in FIG. 10, Step S175 in FIG. 12, or the like) can be omitted.

Furthermore, the front picture of the GOP in the input image (the output stream) may be coded by any coding unit. For example, the coding units that code the front picture of each GOP may be unified.

3. Third Embodiment

Computer

A sequence of processing described above can be executed in hardware and can be executed in software. In this case, for example, the sequence of processing operations may be configured in a manner that is performed in a computer illustrated in FIG. 14.

Figure 14:
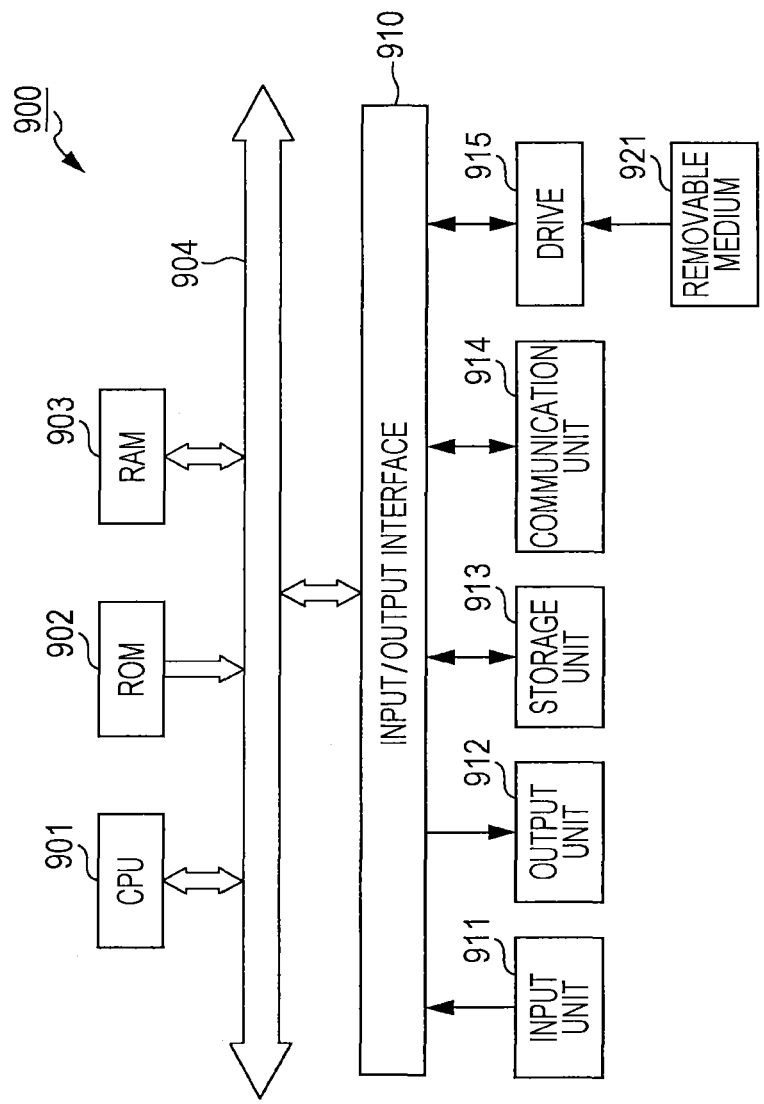
FIG. 14 is a block diagram illustrating a main configuration example of a computer.

In FIG. 14, a central processing unit (CPU) 901 of a computer 900 performs various processing operations according to a program that is stored in a read only memory (ROM) 902 or a program that is loaded from a storage unit 913 onto a random access memory (RAM) 903. Data and the like necessary for the CPU 901 to perform the various processing operations are also properly stored in the RAM 903.

The CPU 901, the ROM 902, and the RAM 903 are connected to one another through a bus 904. An input/output interface 910 is also connected to the bus 904.

An input unit 911, an output unit 912, a storage unit 913, and a communication unit 914 are connected to the input/output interface 910. The input unit 911 is configured from a keyboard, a mouse, a touch panel, and an input terminal. The output unit 912 is configured from a display, such as a cathode ray tube (CRT), a liquid crystal display (LCD), or an organic electroluminescence display (OLED), an arbitrary output device, such as speaker or an output terminal, and the like. The storage unit 913 is configured from an arbitrary storage medium such as a hard disk or a flash memory, a control unit that controls input and output of such a storage medium, and the like. The communication unit 914 is configured from an arbitrary wired or wireless communication device, such as a modem, a LAN interface, a universal serial bus (USB), and a Bluetooth (a registered trademark) device. The communication unit 914, for example, performs processing that communicates with another communication device through a network including the Internet.

A drive 915 is connected to the input/output interface 910 if necessary. A removable medium 921, such as a magnetic disk, an optical disc, or a magneto-optical disc, or a semiconductor memory, is properly mounted in the drive 915. The drive 915, for example, reads a computer program, data, or the like from the removable medium 921 mounted in the drive 915 under the control of the CPU 901. The data, or the computer program that is read is supplied, for example, to the RAM 903. Furthermore, the computer program that is read from the removable medium 921 is installed in the storage unit 913 if necessary.

If the sequence of processing operations described above is performed in software, the program that provides a body of such software is installed from the network or a recording medium.

As illustrated in FIG. 14, the recording medium, for example, may be configured not only from the removable medium 921, but also from the ROM 902, or the hard disk included in the storage unit 913. The removable medium 921 is configured from a magnetic disk (including a flexible disk), an optical disc (including a compact disc-read only memory (CD-ROM) and a digital versatile disc (DVD)), a magneto-optical disc (including a mini disc (MD)), a semiconductor memory, or the like, each of which is distributed for delivering the program to a user separately from a main body of an apparatus and on which the program is stored. The ROM 902, on which the program is stored, is delivered to the user in a state of being built into the main body of the apparatus in advance.

Moreover, the program executed by the computer may be a program by which the processing is performed in time series in the order described in the present specification, or may be a program by which the processing is performed in parallel at a necessary timing, such as when a call is performed.

Furthermore, in the present specification, the step of describing the program stored on the recording medium includes not only processing that is performed in time series according to the described order, but also processing that is performed in parallel or individually even though the processing is not necessarily performed in time series.

4. Fourth Embodiment

Imaging Apparatus

The image coding device 100 and the image coding device 200, which are described above, according to the embodiment, can be applied, for example, to various electronic apparatuses such as a transmitter or a receiver, a recording apparatus, or a reproducing apparatus. The transmitter or the receiver is used in delivery through satellite broadcasting, cable broadcasting such as cable TV, and the Internet, delivery to a terminal through cellular communication, and the like. The recording device records the image on a medium such as an optical disc, a magnetic disk, a flexible memory, or the like. The reproducing apparatus reproduces the image from the recording medium.

Figure 15:
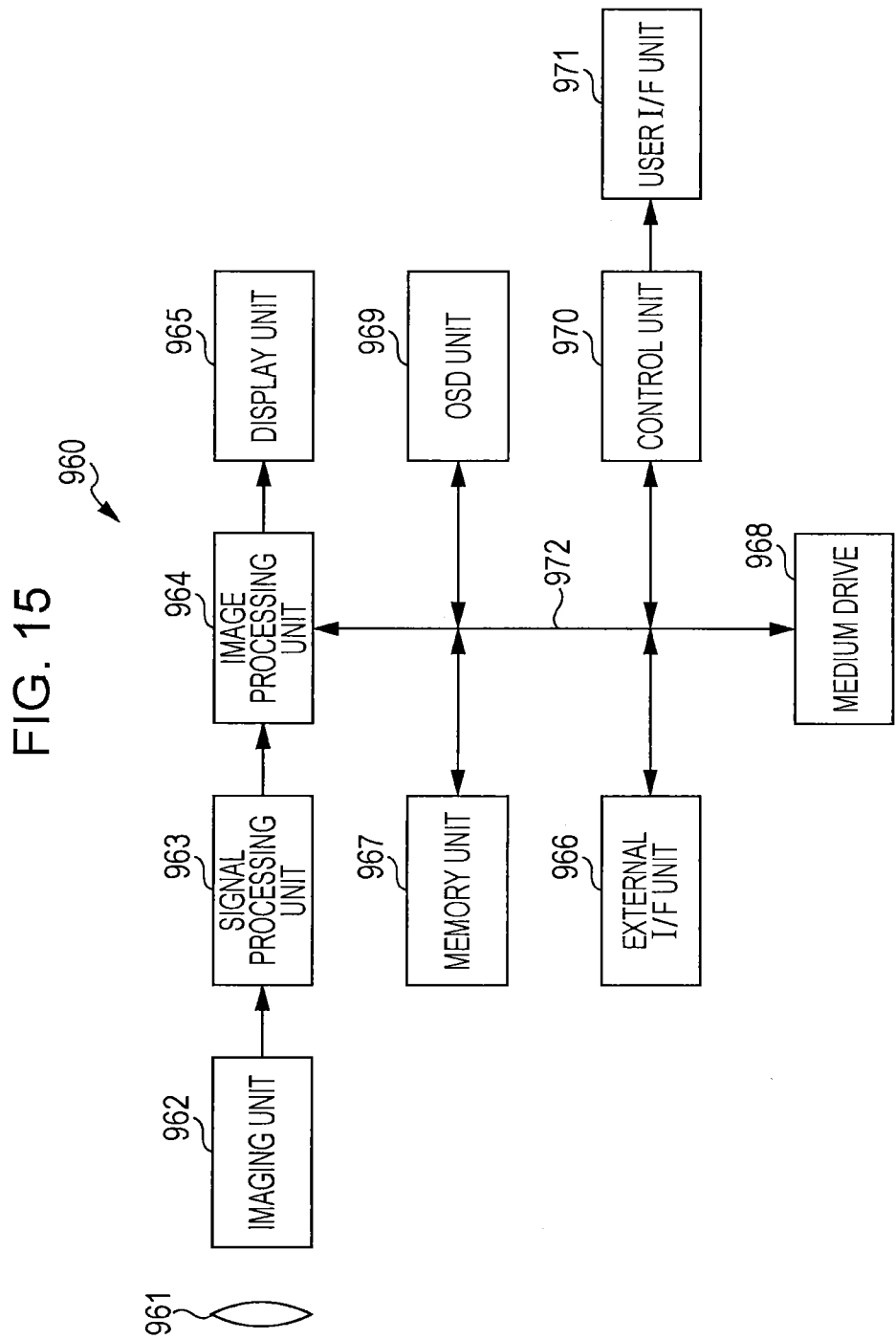
FIG. 15 is a block diagram illustrating a main configuration of an imaging apparatus.

FIG. 15 illustrated one example of an outline configuration of an imaging apparatus to which the embodiment described above is applied. An imaging apparatus 960 images a photographic subject, generates an image of the photographic subject, codes image data on the image, and stores the coded image data in the recording medium.

The imaging apparatus 960 includes an optical block 961, an imaging unit 962, a signal processing unit 963, an image processing unit 964, a display unit 965, an external interface (I/F) unit 966, a memory 967, a medium drive 968, an OSD 969, a control unit 970, a user interface (I/F) unit 971, and a bus 972.

The optical block 961 is connected to the imaging unit 962. The imaging unit 962 is connected to the signal processing unit 963. The display unit 965 is connected to the image processing unit 964. The user interface unit 971 is connected to the control unit 970. The bus 972 provides connections between the image processing unit 964, the external interface unit 966, the memory 967, the medium drive 968, the OSD 969, and the control unit 970.

The optical block 961 has a focal lens, a diaphragm mechanism, and the like. The optical block 961 causes an optical image of the photographic subject to be imaged onto an imaging surface of the imaging unit 962. The imaging unit 962 has an image sensor, such as a charge coupled device (CCD), or a complementary metal oxide semiconductor (CMOS), and by photoelectric conversion, converts the optical image imaged on the imaging surface into an image signal as an electrical signal. Then, the imaging unit 962 outputs the image signal to the signal processing unit 963.

The signal processing unit 963 performs various camera signal processing operations, such as KNEE correction, gamma correction, and color correction, on the image signal that is input from the imaging unit 962. The signal processing unit 963 outputs to the image processing unit 964 the image data that goes through the camera signal processing.

The image processing unit 964 codes the image data that is input from the signal processing unit 963 and generates the code data. Then, the image processing unit 964 outputs the generated code data to the external interface unit 966 or the medium drive 968. Furthermore, the image processing unit 964 decodes the code data that is input from the external interface unit 966 or the medium drive 968, and generates the image data. Then, the image processing unit 964 outputs the generated image data to the display unit 965. Furthermore, the image processing unit 964 may output to the display unit 965 the image data that is input from the signal processing unit 963 and display the image on the display unit 965. Furthermore, the image processing unit 964 may output to the display unit 965 the display data that is obtained from the OSD 969 and superimpose the display data onto the image.

The OSD 969, for example, generates a GUI image, such as a menu, buttons, or a cursor, and outputs the generated image to the image processing unit 964.

The external interface unit 966 is configured, for example, as a USB input/output terminal. The external interface unit 966, for example, connects to the imaging apparatus 960 and a printer when printing the image. Furthermore, the drive is connected to the external interface unit 966 if necessary. For example, a removable medium, such as a magnetic disk or an optical disc, is mounted in the drive, and a program that is read from the removable medium can be installed in the imaging apparatus 960. Additionally, the external interface unit 966 may be configured as a network interface that is connected to a network, such as a LAN or the Internet. That is, the external interface unit 966 plays a role as a transmission unit in the imaging apparatus 960.

The recording medium, which is mounted in the medium drive 968, for example, may be an arbitrary removable medium, such as a magnetic disk, a magneto-optical disc, an optical disc, or a semiconductor memory, which is readable and writable. Furthermore, the recording medium may be fixedly mounted in the medium drive 968. For example, a non-portable storage unit may be configured such as a built-in hard drive or a solid state drive (SSD).

The control unit 970 has a processor such as a CPU, and a memory such as a RAM and ROM. The memory stores a program that is executed by the CPU, program data, and the like. The CPU reads and executes, for example, the program that is stored in the memory when starting the imaging apparatus 960. By executing the program, the CPU controls, for example, operation of the imaging apparatus 960 according to an operation signal that is input from the user interface unit 971.

The user interface unit 971 is connected to the control unit 970. The user interface unit 971, for example, has buttons and switches that a user uses to operate the imaging apparatus 960. The user interface unit 971 detects the operation by the user through such constituent elements, and thus generates the operation signal and outputs the generated operation signal to the control unit 970.

In the imaging apparatus 960 with this configuration, the image processing unit 964 has the same function as the image coding device 100 (refer to FIG. 2) or the coding device 200 (refer to FIG. 13) described above, according to the embodiment. Accordingly, the reduction in image quality due to the coding of the image in the imaging apparatus 960 can be suppressed.

Moreover, in the present specification, a system refers to an entire system that is configured from multiple devices (apparatuses).

Furthermore, the configuration described above as having one device (or processing unit) may be changed to one that has multiple devices (or processing units). Conversely, the configuration described above as having the multiple devices (or processing units) may be changed to one that has one device (processing unit). Furthermore, a configuration other than the configurations described above may be added to a configuration of each device (or each processing unit). Moreover, when the configurations and operations are substantially the same as the entire system, one part of a configuration of a certain device (or a certain processing unit) may be included in a configuration of another device (or another processing unit). Basically, the embodiments of the present technology are not limited to the embodiments described above and various modifications can be made within a scope that does not depart from the gist of the present technology.

Moreover, the present disclosure may employ the following configurations.

(1) An image processing device including: a division unit that divides pictures of image data into multiple arrangements; multiple coding units, each of which codes pictures in the mutually-different arrangements that result from the division by the division unit and generates a stream; and a composition unit that composites the streams in the arrangements, which are generated by the multiple coding units, in which the coding unit generates header information on the stream in such a manner that a stream which results from the compositing by the composition unit becomes normal.

(2) The image processing device according to any one of (1), and (3) to (12), in which the coding unit generates the header information in such a manner that information relating to the picture and a reference picture becomes normal in the stream that results after the composition.

(3) The image processing device according to any one of (1), (2), and (3) to (12), and in which the coding unit generates the header information in such a manner that a value of syntax which stipulates a maximum value of a reference index in a reference picture list becomes a normal value in the stream that results after the composition.

(4) The image processing device according to any one of (1) to (3) and (5) to (12), in which the coding unit generates the header information in such a manner that a value of syntax relating to a point in time at which reading from a coded picture buffer is performed becomes a normal value in the stream that results after the composition.

(5) The image processing device according to any one of (1) to (4) and (6) to (12), in which the coding unit generates the header information in such a manner that a value of syntax which is used as an identifier of a short-term reference picture becomes a normal value in the stream that results after the composition.

(6) The image processing device according to any one of (1) to (5) and (7) to (12), in which the coding unit generates the header information in such a manner that a value of syntax which is used in calculating a picture order count (POC) becomes a normal value in the stream that results after the composition.

(7) The image processing device according to any one of (1) to (6) and (8) to (12), in which the coding unit generates the header information in such a manner that a value of syntax indicating a maximum reference index value of a reference picture list becomes a normal value in the stream that results after the composition.

(8) The image processing device according to any one of (1) to (7) and (9) to (12), in which the coding unit generates the header information in such a manner that a value of flag information relating to rearranging of a reference picture list becomes a normal value in the stream that results after the composition.

(9) The image processing device according to any one of (1) to (8) and (10) to (12), in which the coding unit generates the header information in such a manner that a value of syntax relating to control of rearranging of a reference picture list becomes a normal value in the stream that results after the composition.

(10) The image processing device according to any one of (1) to (9), (11), and (12), in which the coding unit generates the header information in such a manner that a value of syntax indicating an absolute value of a difference between a picture number of a picture that is moved to a current index of a reference picture list and a prediction value of the picture number becomes a normal value in the stream that results after the composition.

(11) The image processing device according to any one of (1) to (10) and (12), in which each coding unit codes the picture in the arrangement that is assigned to the each image coding unit, according to a group-of-pictures (GOP) structure, and in which the composition unit composites the streams in the arrangements according to the GOP structure in image data that is present before the division unit performs the division.

(12) The image processing device according to any one of (1) to (11), in which the coding unit codes the picture that is the front of the GOP in the arrangement which is assigned to the coding unit, but is not the front of the GOP in the image data which is present before the division unit performs the division, as a P picture that is entirely configured from all intra macro blocks.

(13) An image processing method including: dividing pictures of image data into multiple arrangements; coding pictures in each of the arrangements that result from the division, and generating a stream in each of the arrangements; generating header information on the stream in such a manner that a stream which results after composition becomes normal, in coding the pictures in each of the arrangements; and compositing the generated streams in each of the arrangements.

(14) A program for causing a computer to perform: dividing pictures of image data into multiple arrangements; coding pictures in each of the arrangements that result from the division, and generating a stream in each of the arrangements; generating header information on the stream in such a manner that a stream which results after composition becomes normal, in coding the pictures in each of the arrangements, and compositing the generated streams in each of the arrangements.

(15) An image processing apparatus including: an imaging unit that images a photographic subject; a division unit that divides pictures of image data that the imaging unit obtains by imaging the photographic subject into multiple arrangements; multiple coding units, each of which codes pictures in the mutually-different arrangements that result from the division by the division unit and generates a stream; and a composition unit that composites the streams in the arrangements, which are generated by the multiple coding units, in which the coding unit generates header information on the stream in such a manner that a stream which results from the compositing by the composition unit becomes normal.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing device comprising:
coding circuitry configured to:
divide pictures of image data into a first group of even-numbered images and a second group of odd-numbered images;
parallel process the first group and the second group independently of each other to generate a first stream of coded data of the first group and a second stream of coded data of the second group, wherein no information is exchanged between processing of the first group and the second group, a front picture of a group-of-pictures (GOP) structure of the first stream is coded as an l-frame and a front picture of the GOP structure of the second stream is coded as a P-frame; and
composite the first steam and the second stream by alternatively arranging each one of the first group and the second group, wherein (i) a first header information of the first stream and (ii) a second header information of the second stream are combined to generate header information on the composited first and second streams.

2. The image processing device according to claim 1, wherein the coding circuitry is further configured to generate the header information in such a manner that information relating to the picture and a reference picture becomes correct syntaxes in the stream that results after the composition.

3. The image processing device according to claim 2, wherein the coding circuitry is further configured to generate the header information in such a manner that a value of syntax which stipulates a maximum value of a reference index in a reference picture list becomes a normal value in the stream that results after the composition.

4. The image processing device according to claim 2, wherein the coding circuitry is further configured to generate the header information in such a manner that a value of syntax relating to a point in time at which reading from a coded picture buffer is performed becomes a normal value in the stream that results after the composition.

5. The image processing device according to claim 2, wherein the coding circuitry is further configured to generate the header information in such a manner that a value of syntax which is used as an identifier of a short-term reference picture becomes a normal value in the stream that results after the composition.

6. The image processing device according to claim 2, wherein the coding circuitry is further configured to generate the header information in such a manner that a value of syntax which is used in calculating a picture order count (POC) becomes a normal value in the stream that results after the composition.

7. The image processing device according to claim 2, wherein the coding circuitry is further configured to generate the header information in such a manner that a value of syntax indicating a maximum reference index value of a reference picture list becomes a normal value in the stream that results after the composition.

8. The image processing device according to claim 2, wherein the coding circuitry is further configured to generate the header information in such a manner that a value of flag information relating to rearranging of a reference picture list becomes a normal value in the stream that results after the composition.

9. The image processing device according to claim 2, wherein the coding circuitry is further configured to generate the header information in such a manner that a value of syntax relating to control of rearranging of a reference picture list becomes a normal value in the stream that results after the composition.

10. The image processing device according to claim 2, wherein the coding circuitry is further configured to generate the header information in such a manner that a value of syntax indicating an absolute value of a difference between a picture number of a picture that is moved to a current index of a reference picture list and a prediction value of the picture number becomes a normal value in the stream that results after the composition.

11. The image processing device according to claim 1, wherein the coding circuitry is further configured to code the pictures that are assigned according to the GOP structure, and
wherein the coding circuitry composites the streams according to the GOP structure in image data that is present before dividing the pictures of image data.

12. The image processing device according to claim 11, wherein the coding circuitry is further configured to code a picture that is the front of the GOP which is assigned to the coding circuitry, but is not the front of the GOP in the image data which is present before the dividing, as a P picture that is entirely configured from all intra macro blocks.

13. An image processing method performed by coding circuitry, the method comprising:
dividing pictures of image data into a first group of even-numbered images and a second group of odd-numbered images;
parallel processing the first group and the second group independently of each other to generate a first stream of coded data of the first group and a second stream of coded data of the second group, wherein no information is exchanged between processing of the first group and the second group, a front picture of a group-of-pictures (GOP) structure of the first stream is coded as an I-frame and a front picture of the GOP structure of the second stream is coded as a P-frame; and compositing the first steam and the second stream by alternatively arranging each one of the first group and the second group, wherein (i) a first header information of the first stream and (ii) a second header information of the second stream are combined to generate header information on the composited first and second streams.

14. A non-transitory computer readable medium storing a program thereon that, when executed by coding circuitry, causes the coding circuitry to perform a method comprising:

dividing pictures of image data into a first group of even-numbered images and a second group of odd-numbered images;

parallel processing the first group and the second group independently of each other to generate a first stream of coded data of the first group and a second stream of coded data of the second group, wherein no information is exchanged between processing of the first group and the second group, a front picture of a group-of-pictures (GOP) structure of the first stream is coded as an I-frame and a front picture of the GOP structure of the second stream is coded as a P-frame; and compositing the first steam and the second stream by alternatively arranging each one of the first group and the second group, wherein (i) a first header information of the first stream and (ii) a second header information of a second stream are combined to generate header information on the composited first and second streams.

15. An image processing apparatus comprising:

coding circuitry configured to:

image a photographic subject;

divide pictures of image data that the coding circuitry obtains by imaging the photographic subject into a first group of even-numbered images and a second group of odd-numbered images;

parallel process the first group and the second group independently of each other to generate a first stream of coded data of the first group and a second stream of coded data of the second group, wherein no information is exchanged between processing of the first group and the second group, a front picture of a group-of-pictures (GOP) structure of the first stream is coded as an I-frame and a front picture of the GOP structure of the second stream is coded as a P-frame; and composite the first steam and the second stream by alternatively arranging each one of the first group and the second group, wherein (i) a first header information of the first stream and (ii) a second header information of the second stream are combined to generate header information on the composited first and second streams.

* * * * *